(12) United States Patent
Rohmer

(10) Patent No.: US 9,608,423 B1
(45) Date of Patent: Mar. 28, 2017

(54) ELECTRICAL WIRING DEVICE ASSEMBLY WITH WALL PLATE

(71) Applicant: Pass & Seymour, Inc., Syracuse, NY (US)

(72) Inventor: Richard Rohmer, Jordan, NY (US)

(73) Assignee: PASS & SEYMOUR, INC., Syracuse, NY (US)

( * ) Notice: Subject to any disclaimer, the term of this patent is extended or adjusted under 35 U.S.C. 154(b) by 0 days.

(21) Appl. No.: 14/938,384

(22) Filed: Nov. 11, 2015

(51) Int. Cl.
*H02G 3/14* (2006.01)

(52) U.S. Cl.
CPC .................................... *H02G 3/14* (2013.01)

(58) Field of Classification Search
USPC .......................................................... 174/66
See application file for complete search history.

(56) References Cited

U.S. PATENT DOCUMENTS

| | | | |
|---|---|---|---|
| 6,024,236 A * | 2/2000 | Jannot | H02B 1/50 174/66 |
| 6,875,940 B2 | 4/2005 | Endres | |
| 6,974,910 B2 | 12/2005 | Rohmer | |
| 6,979,790 B2 | 12/2005 | Endres | |
| 6,979,791 B2 | 12/2005 | Endres | |
| 7,030,318 B2 | 4/2006 | Tufano | |
| 7,034,236 B2 | 4/2006 | Endres | |
| 7,285,723 B2 | 10/2007 | Lindenstraus | |
| 7,294,782 B2 | 11/2007 | Lindenstraus | |
| 7,435,903 B2 | 10/2008 | Tufano | |
| 7,732,710 B2 | 6/2010 | Oddsen | |
| 7,985,937 B2 | 7/2011 | Wu | |
| RE43,156 E | 2/2012 | Lindenstraus | |
| 2006/0124337 A1 | 6/2006 | Schmieta | |
| 2006/0124338 A1 | 6/2006 | Tufano | |

* cited by examiner

*Primary Examiner* — Dhirubhai R Patel
(74) *Attorney, Agent, or Firm* — Frederick J M Price; Bond, Schoeneck & King, PLLC

(57) ABSTRACT

A wall plate is disclosed that includes a plate portion having a finish surface bounded by a perimeter. The finish surface has a latitudinal profile characterized by a latitudinal arc and a longitudinal profile characterized by a longitudinal arc. The latitudinal arc is defined as a section of a first circle having a first radius and a first chord substantially equal to a latitudinal dimension of the plate portion. The first radius is a function of the number of gangs covered by the wall plate. The longitudinal arc is defined as a portion of a second circle having a second radius and a second chord substantially equal to a longitudinal dimension of the plate portion. The wall plate also includes a wall member disposed around the perimeter to form an interior volume.

46 Claims, 24 Drawing Sheets

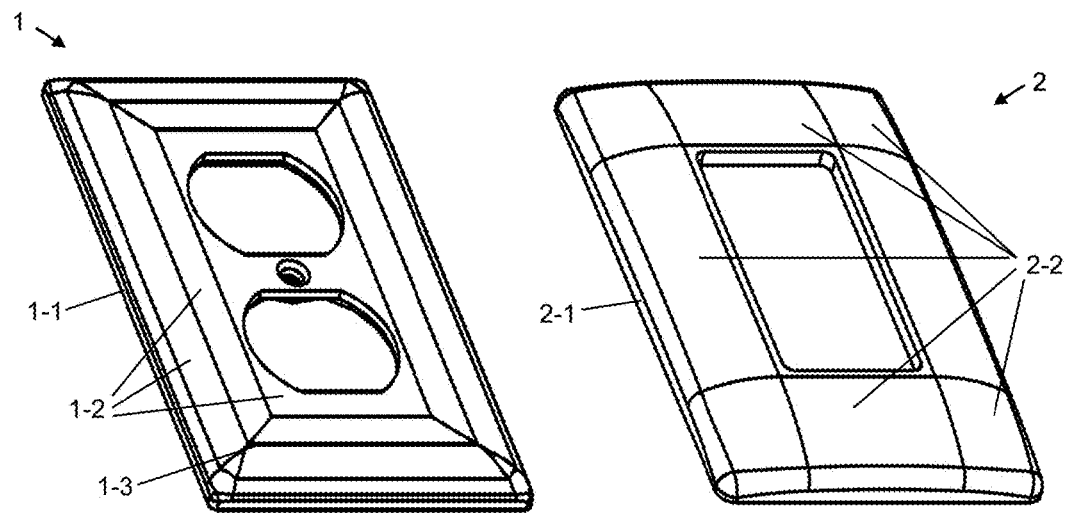
Fig. 1A
(Conventional Art)
Fig. 1B
(Conventional Art)
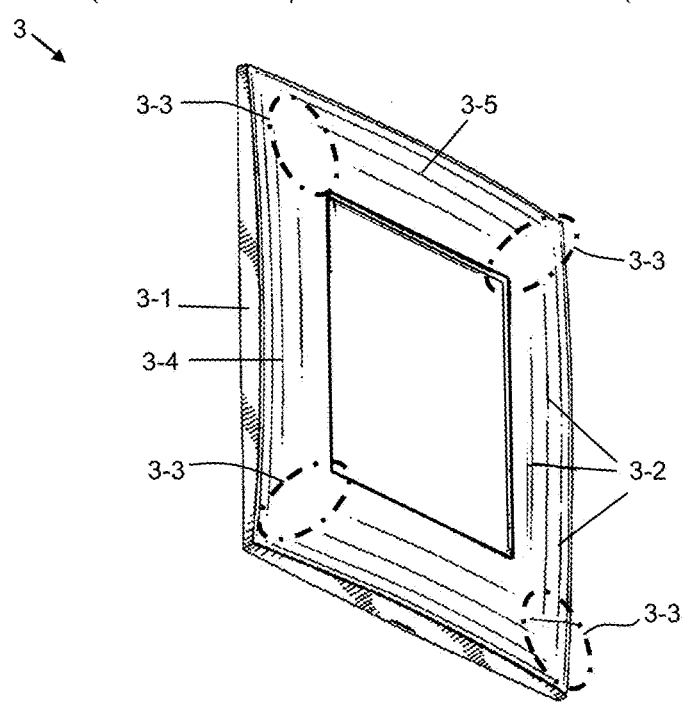
Fig. 1C
(Conventional Art)

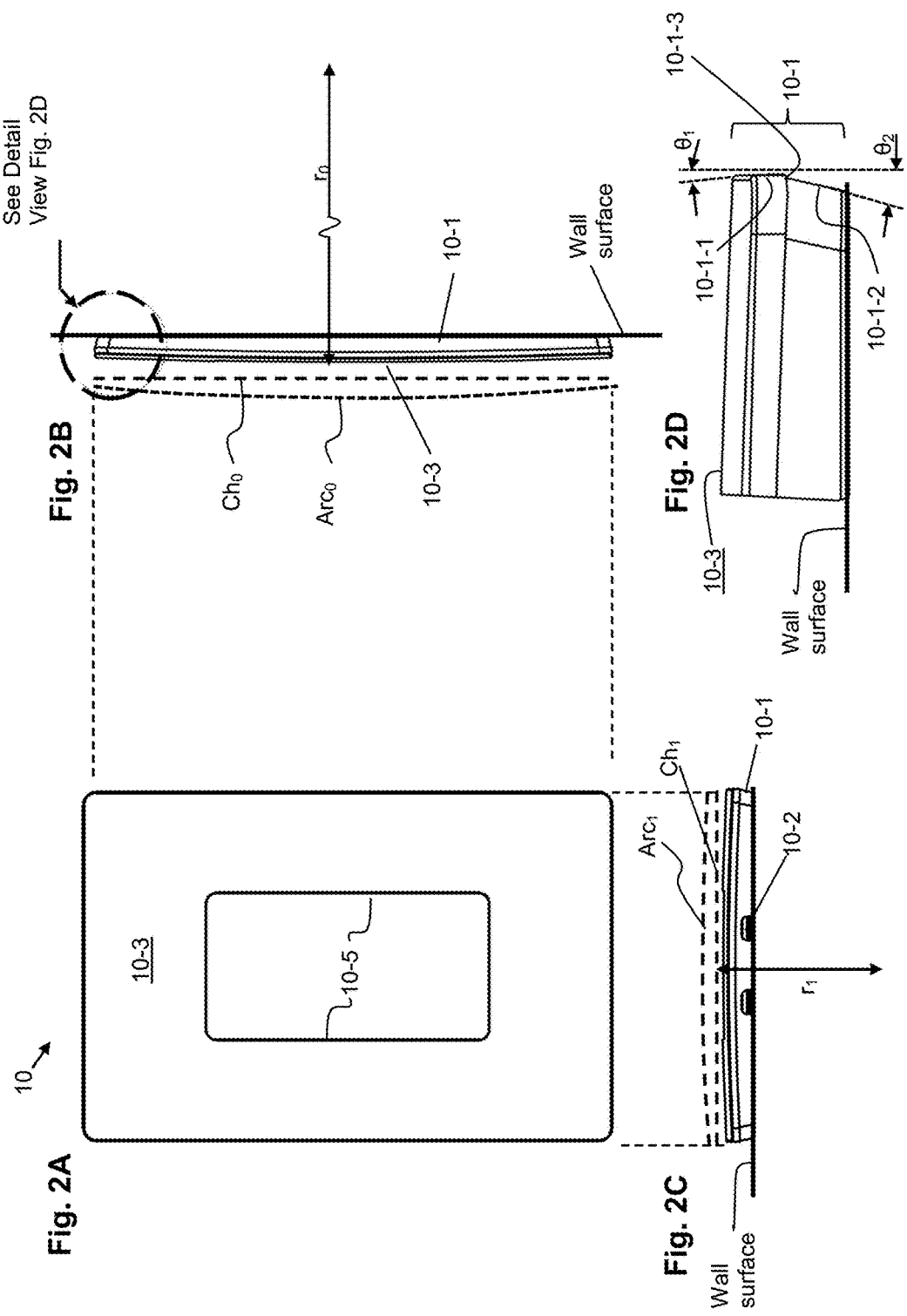

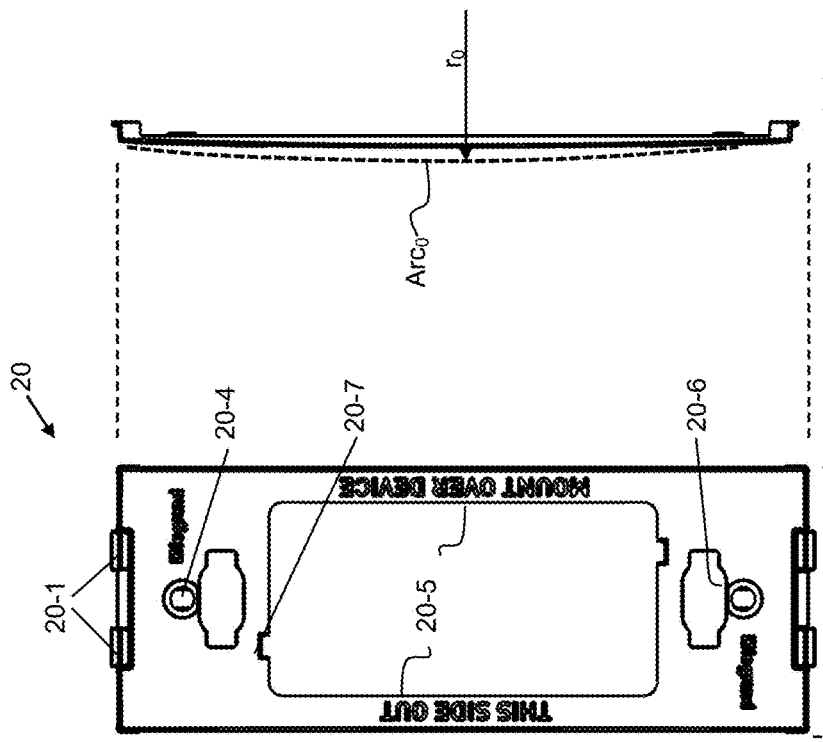

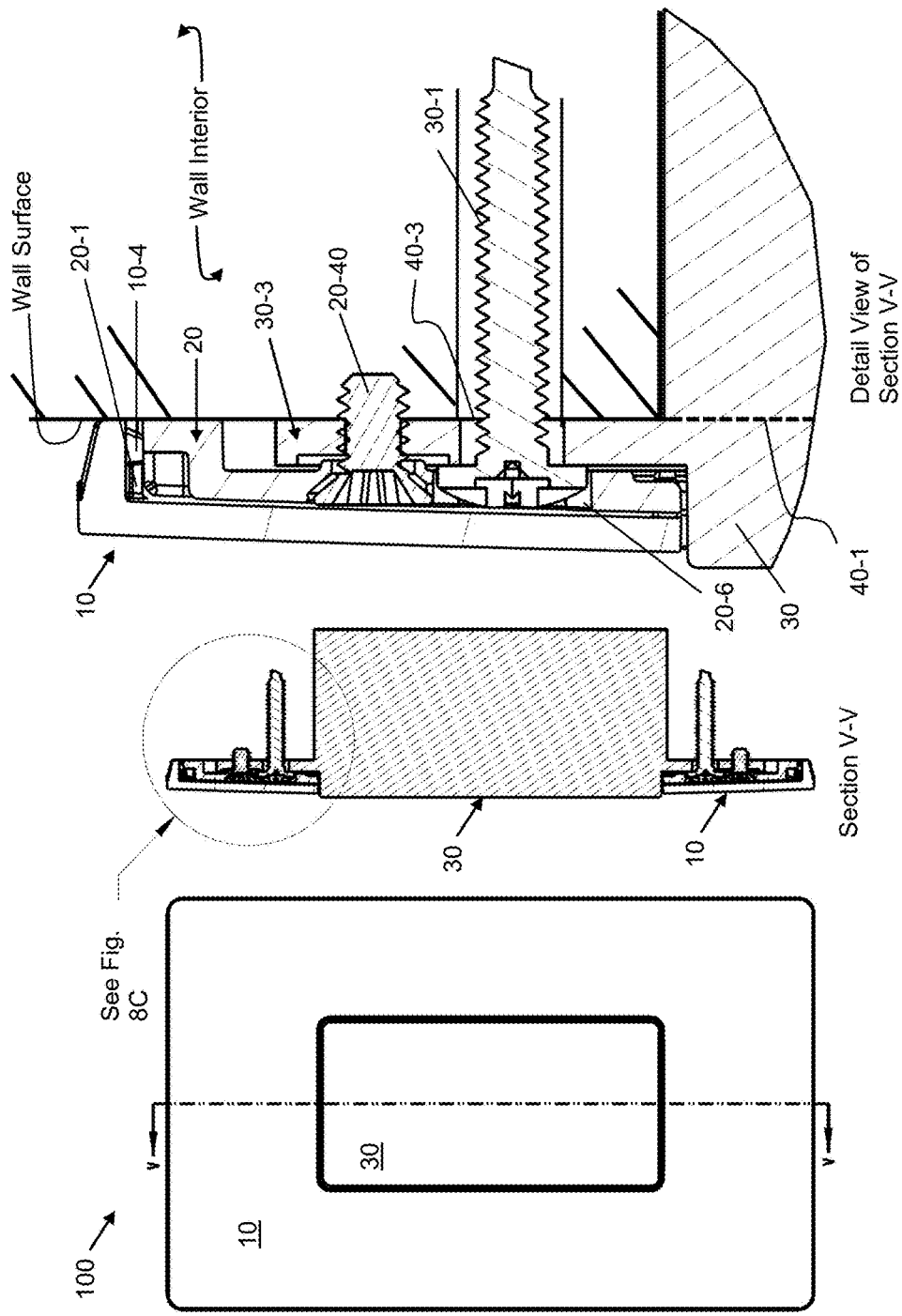

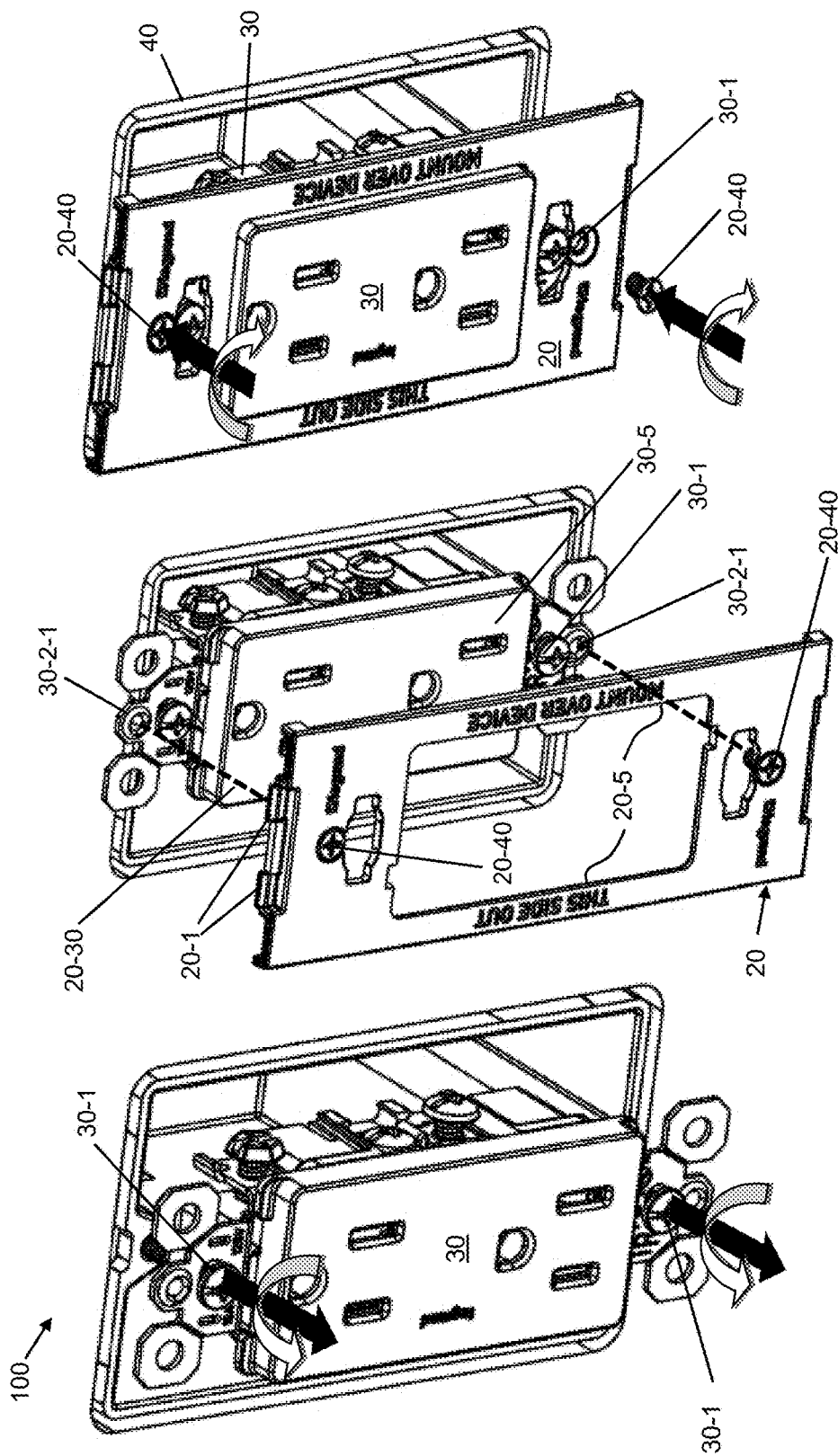

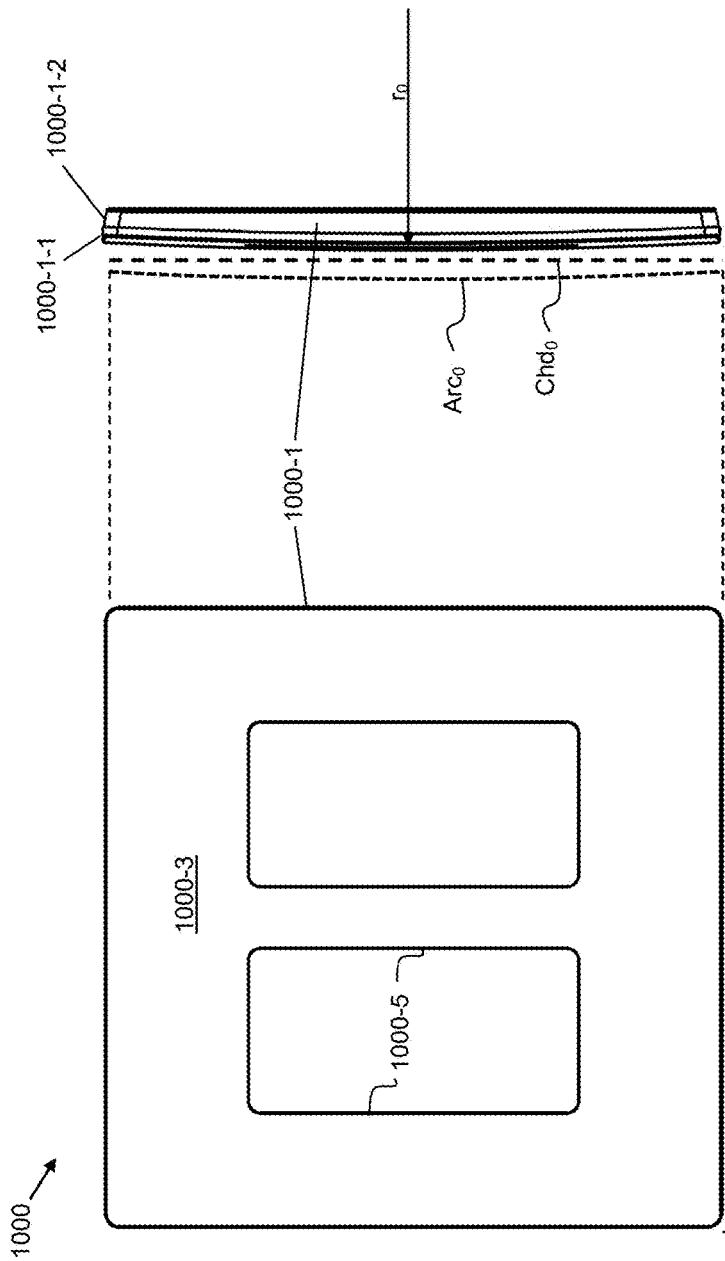
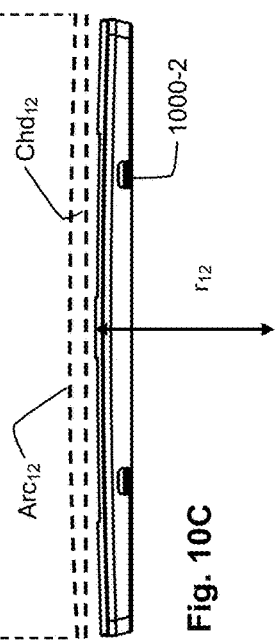

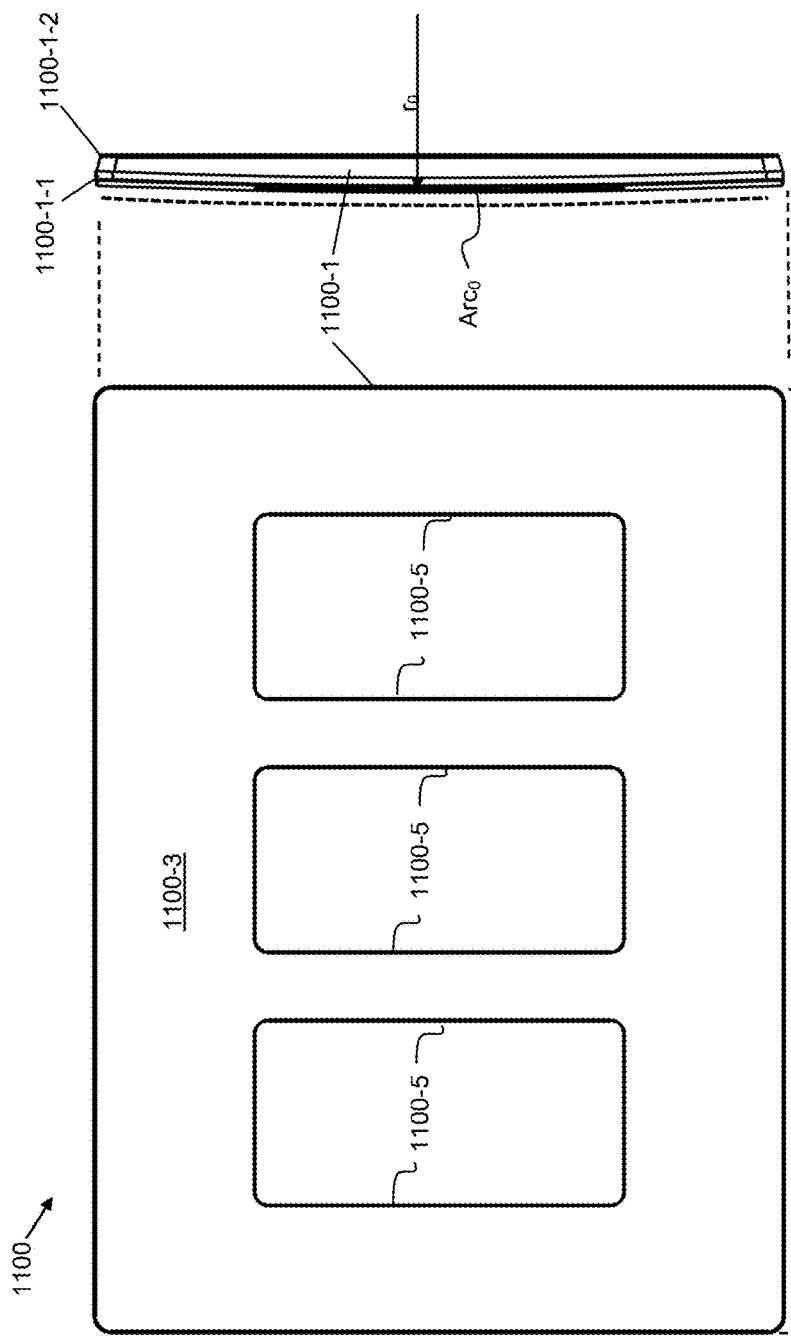
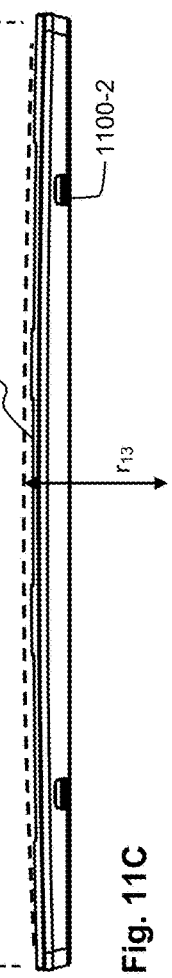
Fig. 11A
Fig. 11B
Fig. 11C

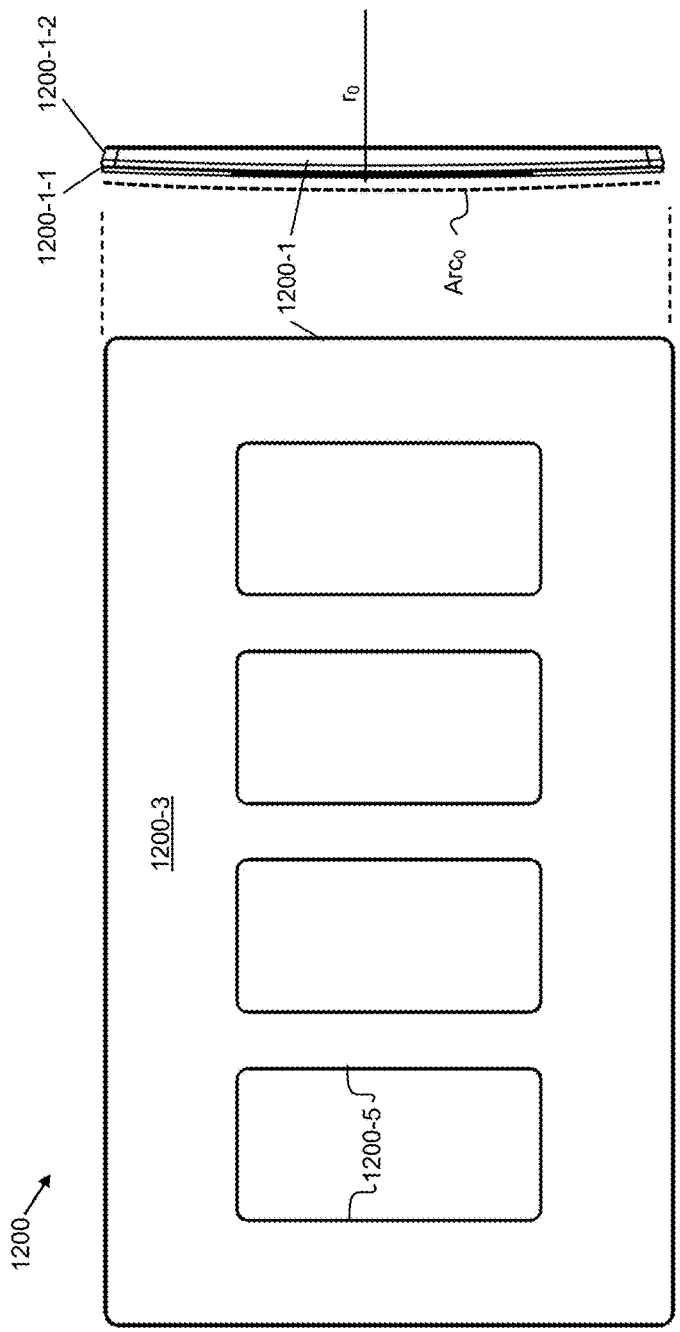
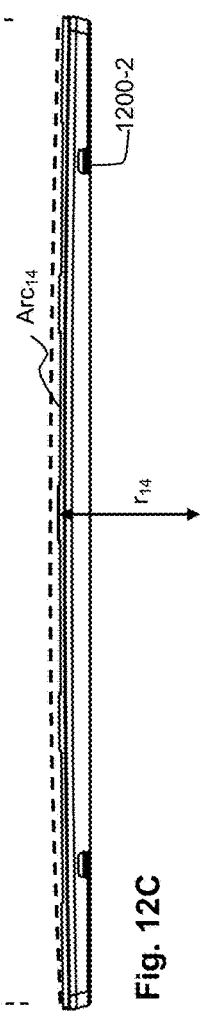
Fig. 12A
Fig. 12B
Fig. 12C

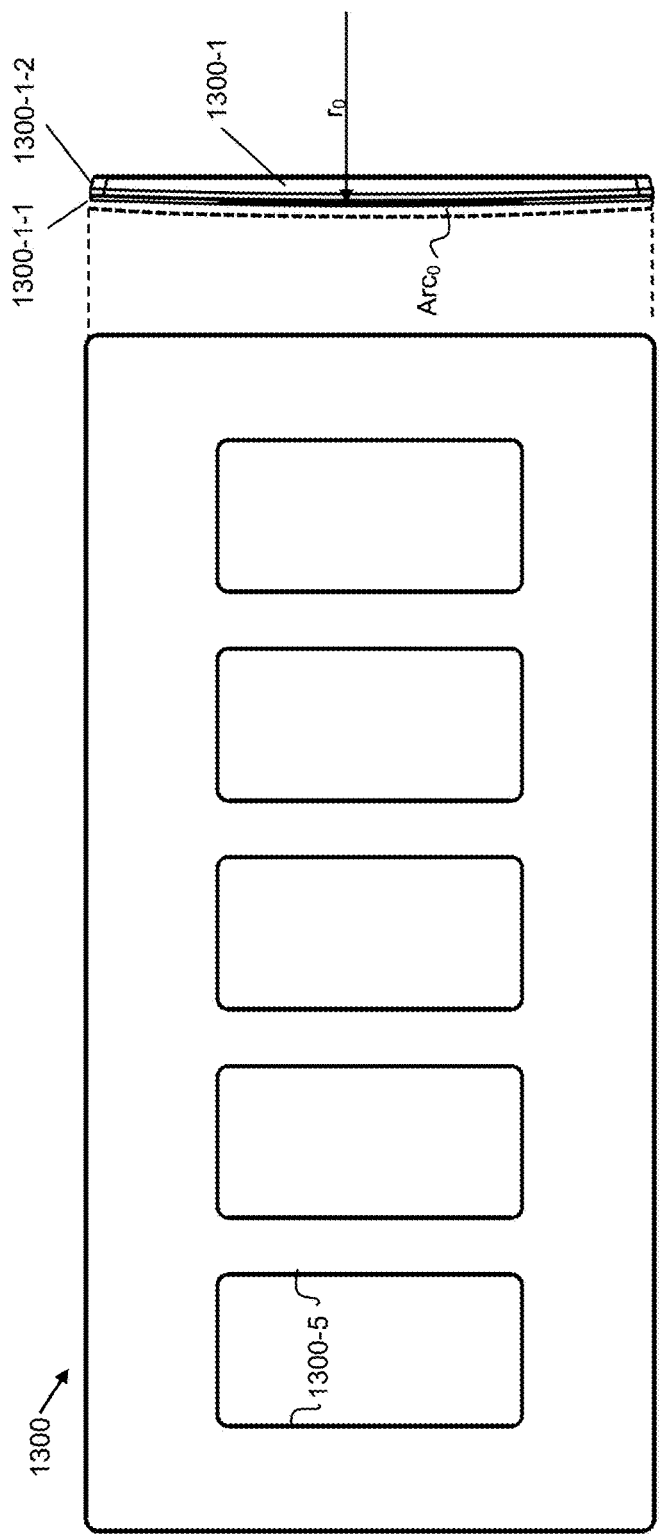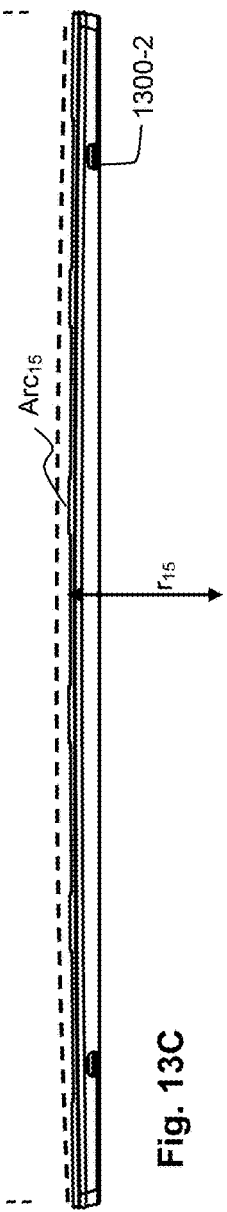

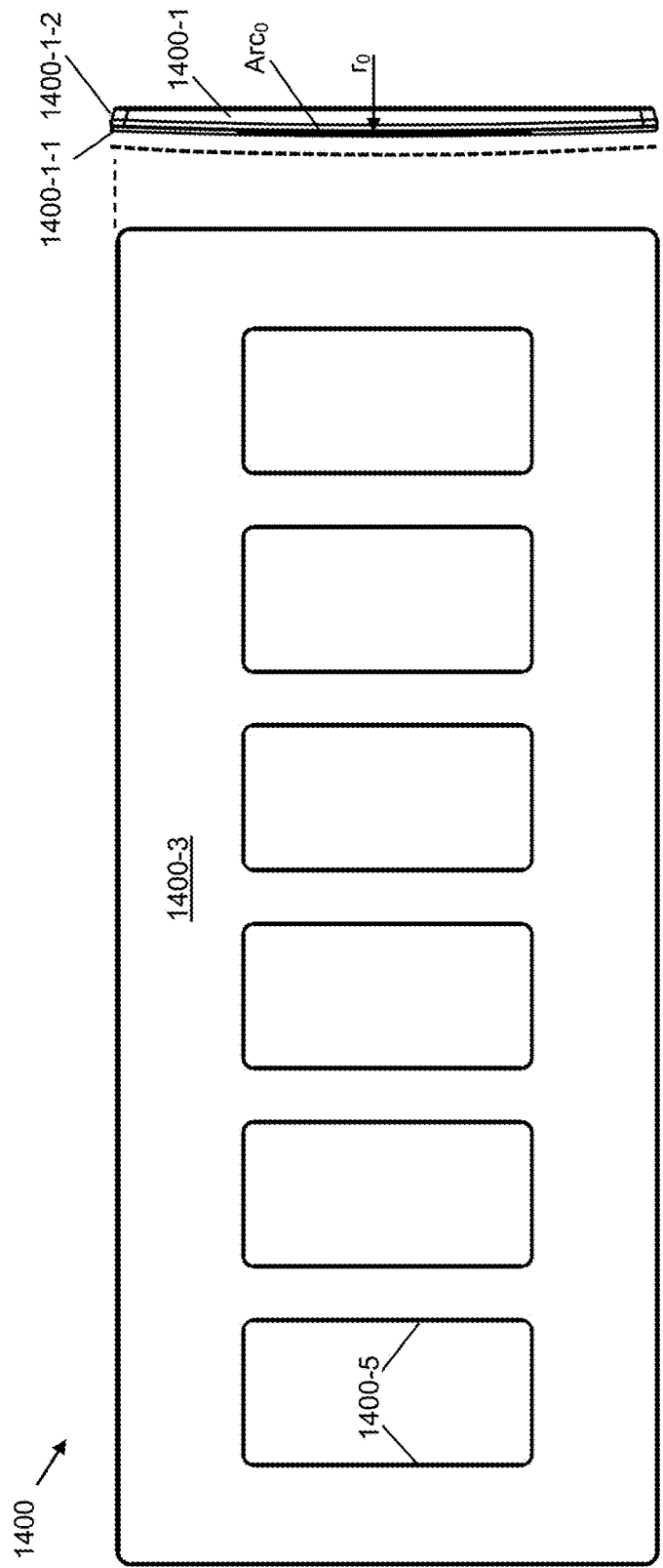
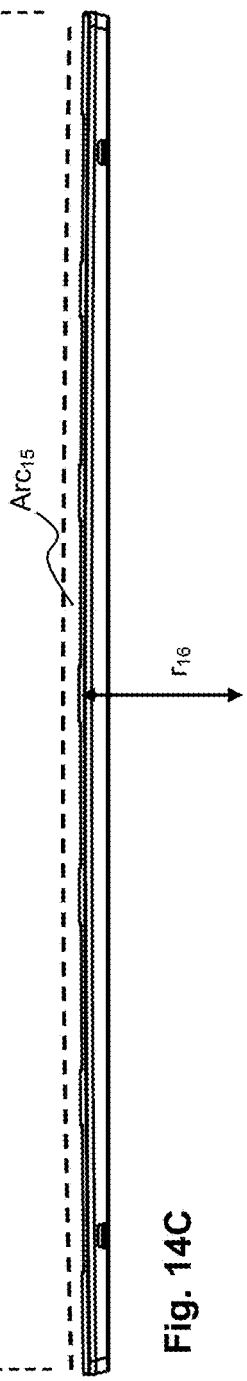
Fig. 14B
Fig. 14A
Fig. 14C

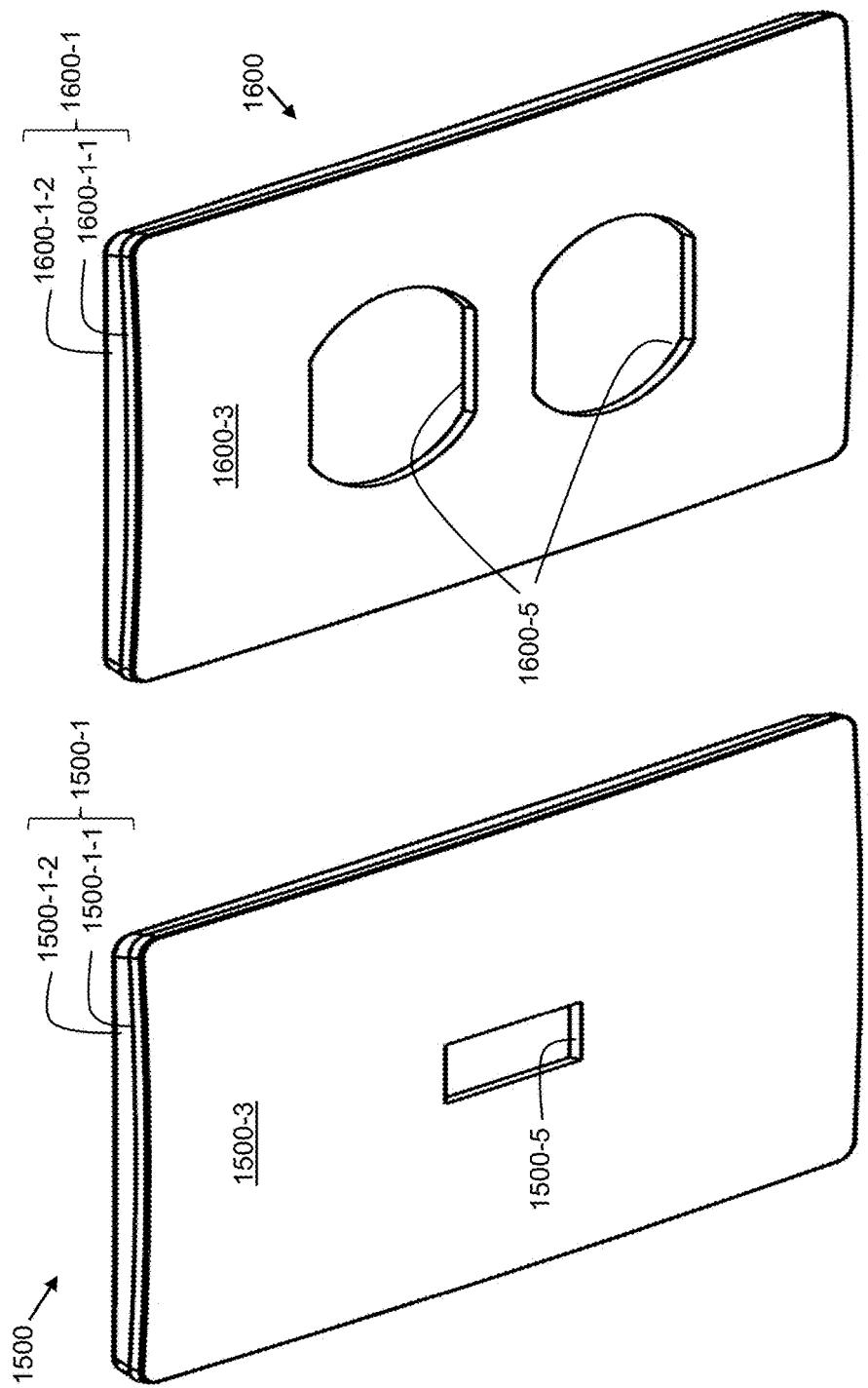

ELECTRICAL WIRING DEVICE ASSEMBLY WITH WALL PLATE

BACKGROUND OF THE INVENTION

1. Field of the Invention

The present invention relates generally to electrical wiring device assemblies, and particularly to electrical wiring device assemblies with wall plates.

2. Technical Background

When an electrical wiring device is installed in new construction, a wall box is attached to one of the framing studs, and sheetrock or some other material, is placed over the framing studs with a wall box opening formed therein. (In an old-work installation, an opening is formed in an existing wall surface and the wall box is attached to the wall surface). Once the walls are "sheet rocked" and mudded, an electrician connects the terminals of the electrical wiring device to their respective hot and neutral conductors, and attaches the wiring device to the wall box. (Those skilled in the art will appreciate that the term electrical wiring device refers to, but is not limited to, electrical switches, outlet receptacles, protective devices (e.g., GFCIs, AFCIs, etc.), lighting dimmers, fan or motor speed control devices, and etc.).

After the electrical wiring device is installed, a wall plate is typically placed over the installed electrical wiring device to complete the enclosure, i.e., to prevent the building occupant from having access to the interior of the wall box. In other words, the wall plate functions as a protective cover for the wall box installation by preventing access to the electrical wires in the interior of the electrical box. Moreover, the wall plate has an aesthetic function because it hides the wall opening, the electrical wiring, the wall box and the electrical wiring device ground straps and provides a finished look. While the typical wall plate may be suitable from a protective standpoint (i.e., it completes the enclosure), it usually falls short aesthetically.

Referring to FIG. 1A, an example of a conventional "No. 8" wall plate 1 is shown. This type of wall plate is, of course, configured to complete the enclosure for a standard outlet receptacle having top and bottom receptacles. The wall plate includes a wall portion 1-1 that abuts the wall surface if the wall surface is relatively flat. If the wall surface is not flat, the wall portion 1-1 may draw attention to the uneven nature of the wall since gaps will become apparent between the wall plate and recessed regions of the wall surface. In FIG. 1A, the wall plate 1 is comprised of approximately 21 separate substantially planar facets 1-2. Moreover, plate 1 also includes a miter joint 1-3 at each corner thereof. Each facet is substantially planar and thus exhibits a specular reflection; i.e., light originating from a single incoming direction is reflected from the planar surface so that the outgoing light is directed toward a single outbound direction. Since there are about 21 facets, there will be 21 reflected light beams directed outwardly toward the user. Thus, everywhere a tangent surface meets a substantially planar surface; the various reflections can produce a "house of mirrors" effect, wherein each surface or pane reflects a different image outwardly in a different direction. Of course, the glare issue can be overcome by replacing the smooth glossy plastic surface of the typical wall plate with other finish materials that do not reflect light. The drawback with this approach is that many of these non-reflective materials, e.g., fabric, etc., collect dirt and grime over time.

In reference to FIG. 1B, a conventional wall plate 2 having a No. 26 opening is shown. Wall plate 2 may be used to complete the enclosure for any type of electrical wiring devices that can fit within the No. 26 opening. All told, this design includes about twenty-five (25) substantially planar surfaces, each potentially being a source of specular reflection. As before, the glare issue can be overcome by replacing the smooth glossy plastic surface of the typical wall plate with other finish materials that do not reflect light. The drawback with this approach is that many of these non reflective materials collect dirt and grime over time. The wall plate 2 also includes a wall portion 2-1 that abuts the wall surface if the wall surface is relatively flat. Once again, if the wall surface is not flat, the wall portion 2-1 may draw attention to the uneven nature of the wall.

In reference to FIG. 1C, another conventional wall plate 3 having a modified No. 26 opening is shown. The wall plate includes a wall portion 3-1 that abuts the wall surface if the wall surface is relatively flat. (As before, if the wall surface is not flat, the wall portion 3-1 may draw attention to the uneven nature of the wall). The cross-sectional profiles of the members (3-4, 3-5) of the wall plate 3 are characterized by splines (a piece wise function). Specifically, each cross-sectional profile is subdivided into parallel segments that have approximately the same width (about 0.01 inches); the height of these segments is typically different. The vertical spline 3-4 defines a surface having a positive first differential, i.e., each segment has increasing height relative to the one before and the rate at which the surface height increases is not constant. The vertical spline 3-4 also defines a surface having a negative second differential since height differences of the segments decrease from left to right. The difference between the first segment height and second segment height is larger than the difference between the second and the third segment heights, etc. The segments of the spline are therefore not connected by a single arc. The spline of the horizontal members 3-5 may be, and usually is, different than the spline of the vertical member 3-4. When the horizontal splines and the vertical splines meet at the corners of the wall plate, they form a miter joint 3-3. When the spline changes its direction, which in this case is every segment (e.g., about 0.01 inches), the light defuses at a different rate making the gradient of the reflected light (or shadow as the case may be) inconsistent and visually unappealing.

As shown in FIG. 1C, the surface of the splined wall plate 3 may show the spline segmentations as an artifact of the injection molding process; as before, reflected light will be reflected in various directions. Moreover, the discontinuity of the miter joint is also visible when light shines on the surface of plate 3. Some users may see the reflected light as glare or "hard on the eye," and thus find them aesthetically displeasing. Once again, the glare issue can be overcome by replacing the smooth glossy plastic surface of the wall plate with non-reflective finish materials; the drawback with this approach is that many of these non-reflective materials collect dirt and grime, and can look dingy over time. Another drawback of this design relates to the wall portion 3-1. Once again, the wall portion 3-1 is configured to abut the wall surface of the installation. As before, if the wall surface is not flat, the bottom of the wall portion 3-1 may draw attention to the uneven nature of the wall while the curvilinear top edge tends to cast curvilinear shadows against the wall. These shadows tend to make the wall plate appear relatively thick or "heavy" looking. Some users find this thickness or heaviness to be aesthetically displeasing.

Some electrical wiring device installations may include multiple wiring devices positioned side by side in a common multi-gang box. The multi-gang box includes several pairs of mounting tabs, each pair being separated from an adjacent pair of mounting tabs by a standard distance, such as 1.812 inches. This standard distance is commonly referred to as a "single-gang width." Of course, each pair of mounting tabs includes a fastener aperture disposed in the top wall of the box and a corresponding fastener aperture disposed in the bottom wall of the box. The centerline passing through the top and bottom fastener holes of each pair is substantially parallel to the side walls of the box. Each device mounted in the multi-gang box is fastened to the top and bottom holes by inserting a fastener screw therein. This gives rise to the problem that the wiring devices are not aligned to each other by the box.

In one approach, the installer may attempt to install one individual wall plate over each device (one plate per gang). The installer then tries to attach the individual wall plates on the box such that they abut each other edge-to-edge. However, if the individual dimmers are not perfectly aligned with each other, the wall plates will not be perfectly aligned either. The wall plates will exhibit a stepped appearance that is both unacceptable and undesirable because the edges of the individual wall plates tend to look rough and non-uniform. In another approach that has been considered, designers avoid the use of individual plates by ordering a custom plate to fit over the entire ensemble of electrical wiring devices. The drawback to this approach relates to the cost and lead time of having a custom wall plate manufactured.

What is needed is a wall plate that obviates or overcomes the drawbacks articulated above. Specifically, an electrical wiring assembly is needed that features a wall plate that has a single surface that reflects light in a uniform and diffuse way so that glare is substantially eliminated and a more aesthetically pleasing presentation is achieved. Moreover, a wall plate is needed that minimizes the perceived thickness of the wall plate, and tends to hide uneven wall surfaces. All of the desirable features articulated above are also needed in a multi-gang wall plate.

SUMMARY OF THE INVENTION

The present invention addresses the needs described above by providing a wall plate that obviates or overcomes the drawbacks articulated above. Specifically, the present invention is directed to an electrical wiring assembly that features a wall plate that has a single surface that reflects light in a uniform and diffuse way so that glare is substantially eliminated and a more aesthetically pleasing presentation is achieved. Moreover, the present invention accomplishes this effect without the use of dirt collecting materials; i.e., the present invention features a single surface that reflects light in a uniform and diffuse way while, at the same time, is comprised of a glossy smoot plastic (e.g., polycarbonate) material. The present invention is also directed to a wall plate that minimizes the perceived thickness of the wall plate, and tends to hide uneven wall surfaces. Finally, the present invention provides all of the desirable features articulated above in multi-gang wall plates.

One aspect of the present invention is directed to a wall plate article for use with at least one electrical wiring device. The at least one electrical wiring device is configured to be mounted to a device box, and the device box is configured to be installed within a structure. The device box has N-gangs, N being an integer value greater than or equal to one. The wall plate article includes a plate portion having a finish surface bounded by a perimeter, the finish surface having a latitudinal profile characterized by a latitudinal arc and a longitudinal profile characterized by a longitudinal arc. The latitudinal arc is defined as a section of a first circle having a first radius and a first chord substantially equal to a latitudinal dimension of the plate portion, the first radius being a function of N. The longitudinal arc is defined as a portion of a second circle having a second radius and a second chord substantially equal to a longitudinal dimension of the plate portion. A wall portion is disposed around the perimeter of the plate portion. The wall portion includes a first wall portion having a substantially uniform width and a second wall portion. The first wall portion is connected to, and extends away from, the perimeter. The second wall portion is characterized by a reverse draft so that the second wall portion extends at a second oblique angle from the first wall portion in a direction under the first wall portion.

In one embodiment, the plate portion includes at least one opening configured to accommodate at least one user interface of the at least one electrical wiring device.

In one version of the embodiment, the at least one opening is selected from a group of openings including a No. 1 opening, a No. 26 opening, or a No. 8 opening.

In one version of the embodiment, the at least one opening includes at least N-openings.

In one embodiment, N is within a range of integers including one (1) and six (6).

In one embodiment, the finish surface is selected from a group of finish surfaces including a substantially smooth surface, a continuous surface, a non-segmented surface, a textured surface, a multi-textured surface or a multi-component surface.

In one embodiment, the wall portion and the plate portion form an interior volume, the interior volume being configured to accommodate a portion of the at least one electrical wiring device therewithin.

In one embodiment, the second wall portion is configured to abut a surface of the structure when the wall plate article is coupled to the at least one electrical wiring device.

In one embodiment, a plurality of longitudinal cross sections taken at a plurality of positions along a latitudinal axis of the plate portion have a substantially identical longitudinal profile characterized by the longitudinal arc, and wherein a plurality of latitudinal cross sections taken at a plurality of positions along a longitudinal axis of the plate portion have a substantially identical latitudinal profile characterized by the latitudinal arc.

In one embodiment, the wall plate article is coupled to the at least one electrical wiring device or the device box without screws.

In one embodiment, the wall portion includes a screwless fastener arrangement configured to couple the article to the electrical wiring device or the device box.

In one embodiment, the first wall portion extends away from the perimeter at a first oblique angle, the first oblique angle being approximately 2° or less, and wherein the second oblique angle is substantially within a range including 5° and 15°.

In one embodiment, the first wall portion includes an overhang substantially parallel to the finish surface, the second wall portion extending at the second oblique angle from the overhang in a direction under the first wall portion and the finish surface.

In one embodiment, the wall plate article is configured to complete the device box enclosure.

In another aspect of the invention, the invention is directed to an electrical wiring device assembly for use in a device box that is configured to be installed within a structure. The device box has N-gangs, N being an integer value greater than or equal to one. The assembly includes a subplate member configured to be coupled to the device box. A wall plate is configured to be coupled to the subplate member. The wall plate includes a finish surface, the finish surface having a latitudinal profile characterized by a latitudinal arc and a longitudinal profile characterized by a longitudinal arc. The latitudinal arc is defined as a section of a first circle having a first radius and a first chord substantially equal to a latitudinal dimension of the wall plate, the first radius being a function of N. The longitudinal arc is defined as a portion of a second circle having a second radius and a second chord substantially equal to a longitudinal dimension of the wall plate. The wall plate further includes a wall portion disposed at a perimeter of the finish surface. The wall portion includes a substantially uniform first wall portion extending from the finish surface and a second wall portion extending from the first wall portion. The second wall portion is configured to substantially extend underneath the finish surface.

In one embodiment, the assembly includes at least one electrical wiring device configured to be installed within the device box.

In one version of the embodiment, the subplate member is configured to be connected to the at least one electrical wiring device.

In one version of the embodiment, the at least one electrical wiring device is selected from a group of electrical wiring devices that include an electrical switch device, a dimmer device, an outlet receptacle device, a timer device, a fan control device, a GFCI, an AFCI, a blank device, a coaxial cable connection device, a phone jack connection device, an RJ45 connection device, an home system control device, a speaker control device, a night light device, an USB receptacle device, an USB connection device, an RCA cable connection device, an occupancy sensor device, a vacancy sensor device, or a combination device including one or more of the above devices.

In one version of the embodiment, the subplate member includes at least one subplate opening configured to accommodate the at least one user interface when the subplate member is coupled to the at least one electrical wiring device, and wherein the wall plate includes at least one wall plate opening configured to accommodate at least one user interface.

In one embodiment, the subplate member further includes a plurality of first screwless attachment elements and the wall plate has a plurality of second screwless attachment elements configured to mate with the plurality of first screwless attachment elements to couple the wall plate to the subplate.

In one embodiment, the subplate member includes at least one subplate opening and the wall plate includes at least one wall plate opening substantially corresponding to the at least one subplate opening, the at least one wall plate opening and the at least one subplate opening being configured to accommodate at least one user interface of at least one electrical wiring device.

In one version of the embodiment, the at least one opening is selected from a group of openings including a No. 1 opening, a No. 26 opening, or a No. 8 opening.

In one version of the embodiment, the at least one opening includes at least N-openings.

In one embodiment, the subplate member includes at least one first alignment element and the wall plate includes at least one second alignment element, the at least one first alignment element and the at least one second alignment element being registered when the wall plate is coupled to the subplate.

In one embodiment, N is within a range of integers including one (1) and six (6).

In one embodiment, a plurality of longitudinal cross sections taken at a plurality of positions along a latitudinal axis of the wall plate have a substantially identical longitudinal profile characterized by the longitudinal arc, and wherein a plurality of latitudinal cross sections taken at a plurality of positions along a longitudinal axis of the wall plate have a substantially identical latitudinal profile characterized by the latitudinal arc.

In one embodiment, the wall plate is coupled to the subplate member without screws, at least one electrical wiring device without screws, or the device box without screws.

In one embodiment, the first wall portion extends away from the perimeter at a first oblique angle, and wherein the second wall portion extends from the first wall portion at a second oblique angle.

In one embodiment, the first wall portion includes an overhang, the overhang having a ledge substantially parallel to the finish surface, the second wall portion extending from the ledge at the second oblique angle.

In one embodiment, the subplate member includes a plate surface having a latitudinal subplate profile characterized by a subplate latitudinal arc and a longitudinal subplate profile characterized by a subplate longitudinal arc so that the subplate member substantially conforms to an interior surface of the wall plate.

In one version of the embodiment, a plurality of longitudinal cross sections of the subplate taken at a plurality of positions along a latitudinal axis of the subplate have a substantially identical longitudinal profile characterized by the subplate longitudinal arc, and wherein a plurality of latitudinal cross sections of the subplate taken at a plurality of positions along a longitudinal axis of the subplate have a substantially identical latitudinal profile characterized by the subplate latitudinal arc.

In one embodiment, the wall plate is configured to complete a device box enclosure when the wall plate is coupled to the subplate member, the second wall portion being configured to abut a surface of the structure when the wall plate completes the device box enclosure.

In yet another aspect of the invention, the invention is directed to a wall plate article for use with at least one electrical wiring device. The at least one electrical wiring device is configured to be mounted to a device box, and the device box is configured to be installed within a structure. The device box has N-gangs, N being an integer value greater than or equal to two, the wall plate article includes a plate portion having a finish surface bounded by a perimeter. The finish surface has a latitudinal profile characterized by a latitudinal arc and a longitudinal profile characterized by a longitudinal arc. The latitudinal arc is defined as a section of a first circle having a first radius and a first chord substantially equal to a latitudinal dimension of the plate portion, the first radius being a function of N. The longitudinal arc is defined as a portion of a second circle having a second radius and a second chord substantially equal to a longitudinal dimension of the plate portion. The wall plate article also includes a wall member disposed around the perimeter to form an interior volume.

In one embodiment, the wall member includes a first wall portion having a substantially uniform width and a second wall portion. The first wall portion is connected to, and extends away from, the perimeter. The second wall portion is characterized by a reverse draft so that the second wall portion extends at a second oblique angle from the first wall in a direction under the first wall portion.

In one version of the embodiment, the first wall portion extends away from the perimeter at a first oblique angle.

In one version of the embodiment, the first oblique angle is approximately 2° or less, and wherein the second oblique angle is substantially within a range including 5° and 15°.

In one embodiment, the plate portion includes at least one opening configured to accommodate at least one user interface of the at least one electrical wiring device, and wherein the at least one opening is selected from a group of openings including a No. 1 opening, a No. 26 opening, or a No. 8 opening.

In one version of the embodiment, the at least one opening includes at least N-openings.

In one version of the embodiment, N is within a range of integers including two (2) and six (6).

In one embodiment, the finish surface is selected from a group of finish surfaces including a substantially smooth surface, a continuous surface, a non-segmented surface, a textured surface, a multi-textured surface or a multi-component surface.

In one embodiment, a plurality of longitudinal cross sections taken at a plurality of positions along a latitudinal axis of the plate portion have a substantially identical longitudinal profile characterized by the longitudinal arc, and wherein a plurality of latitudinal cross sections taken at a plurality of positions along a longitudinal axis of the plate portion have a substantially identical latitudinal profile characterized by the latitudinal arc.

In one embodiment, the wall plate article is configured to mate with a subplate member to form an electrical assembly, and wherein the subplate is configured to be coupled to at least one electrical wiring device.

In one version of the embodiment, the at least one electrical wiring device is selected from a group of electrical wiring devices including an electrical switch device, a dimmer device, an outlet receptacle device, a timer device, a fan control device, a GFCI, an AFCI, a blank device, a coaxial cable connection device, a phone jack connection device, an RJ45 connection device, an home system control device, a speaker control device, a night light device, an USB receptacle device, an USB connection device, an RCA cable connection device, an occupancy sensor device, a vacancy sensor device, or a combination device including one or more of the above listed devices.

In one version of the embodiment, the subplate member includes a plate surface having a latitudinal subplate profile characterized by a subplate latitudinal arc and a longitudinal subplate profile characterized by a subplate longitudinal arc so that the subplate member substantially conforms to an interior surface of the wall plate.

In one version of the embodiment, a plurality of longitudinal cross sections of the subplate taken at a plurality of positions along a latitudinal axis of the subplate have a substantially identical longitudinal profile characterized by the subplate longitudinal arc, and wherein a plurality of latitudinal cross sections of the subplate taken at a plurality of positions along a longitudinal axis of the subplate have a substantially identical latitudinal profile characterized by the subplate latitudinal arc.

In one version of the embodiment, the wall plate is configured to complete a device box enclosure when the wall plate is coupled to the subplate member.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 1A-1C are isometric views of conventional wall plates;

FIGS. 2A-2D are directed to various views of a wall plate in accordance with an embodiment of the present invention;

FIGS. 6A-6D are directed to various views of the subplate depicted in FIG. 5A in accordance with an embodiment of the present invention;

FIGS. 8A-8C are directed to various views of the electrical wiring device assembly depicted in FIG. 7;

FIGS. 9A-9F illustrate an assembly sequence for the electrical wiring device assembly depicted in FIG. 7;

FIGS. 10A-10C are directed to various views of a wall plate in accordance with another embodiment of the present invention;

FIGS. 11A-11C are directed to various views of a wall plate in accordance with another embodiment of the present invention;

FIGS. 12A-12C are directed to various views of a wall plate in accordance with another embodiment of the present invention;

FIGS. 13A-13C are directed to various views of a wall plate in accordance with another embodiment of the present invention;

FIGS. 14A-14C are directed to various views of a wall plate in accordance with another embodiment of the present invention;

FIG. 15 is an isometric view of a No. 1 wall plate in accordance with an embodiment of the present invention; and FIG. 16 is an isometric view of a No. 8 wall plate in accordance with an embodiment of the present invention.

DETAILED DESCRIPTION

Figure 3A:
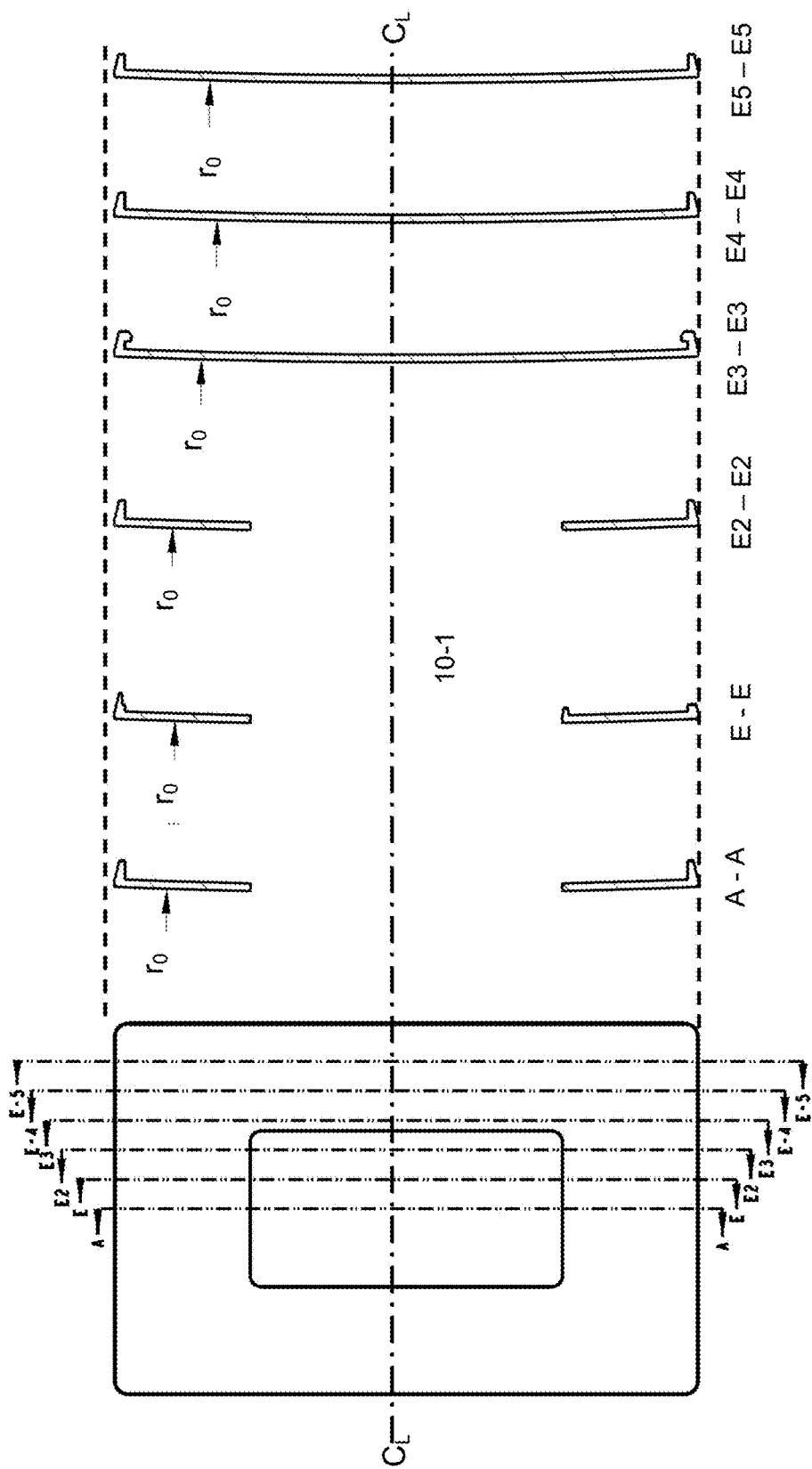
FIG. 3A includes an elevation view of the wall plate juxtaposed with a series of longitudinal cross-sectional views of the wall plate in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the wall plate of the present invention is shown in FIG. 2A, and is designated generally by reference numeral 10.

In accordance with the invention, the wall plate article 10 of the present invention is typically used in conjunction with one or more electrical wiring devices (depending on the number of device box gangs) in an electrical wiring device assembly. As those skilled in the art will appreciate, electrical wiring devices are configured to be mounted to a device box. (See, e.g., FIG. 7). Of course, a device box is configured to be installed within a structure such as a wall with studs, a floor, ceiling, etc.). A device box has N-gangs, wherein N is an integer value greater than or equal to one. In some installations, the wall plate article may be configured to "complete the device box enclosure." Those of ordinary skill in the art will appreciate that when the enclosure is completed, the device box interior is substantially inaccessible to a user or occupant of the structure. In other words, the wall plate of the present invention covers most of the electrical wiring device and the all of the device box interior (See, e.g., FIG. 7) to prevent individuals from being shocked or electrocuted. Moreover, the wall plate of the present invention conceals all of electrical wiring behind the electrical device(s) in the device box interior. (The wall plate article may also be employed in modular electrical wiring device system that include a frame that completes the enclosure. Reference is made to U.S. Published Patent Application No. 20130277086, which is incorporated herein by reference as though fully set forth in its entirety, for a more detailed explanation of a modular electrical wiring device system).

In accordance with the invention, therefore, the wall plate article of the present invention includes a plate portion comprising a finish surface having a latitudinal cross-section characterized by a latitudinal arc and a longitudinal cross section characterized by a longitudinal arc. The latitudinal arc is defined as a section of a first circle having a first radius and a first chord substantially equal to a latitudinal dimension of the plate portion, the first radius being a function of N. The longitudinal arc is defined as a portion of a second circle having a second radius and a second chord substantially equal to a longitudinal dimension of the plate portion. Thus, as shown herein, e.g., the wall plate has a single finish surface that is designed and configured to reflect light in a diffuse and uniform way even if the wall plate is comprised of a glossy plastic or metallic material.

The wall plate article of the present invention also includes a wall member formed around a perimeter of the plate portion to form an interior volume. The wall member includes a first wall portion having a substantially uniform width and a second wall portion. The first wall portion is connected to, and extends away from, the perimeter of the finish surface. The second wall portion is characterized by a reverse draft; in other words, the second wall portion extends at a second oblique angle from the first wall portion so that it folds under the first wall portion (and in some embodiments under the finish surface). The wall plates described and disclosed below are characterized by all of the features and benefits described above.

As embodied herein, and depicted in FIGS. 2A-2D, various views of a wall plate 10 in accordance with the present invention are disclosed. FIG. 2A is a front elevation view of a single gang wall plate 10. Wall plate 10 may be comprised of a plastic (e.g., polycarbonate) or metallic material and thus be characterized by a relatively smooth finish surface 10-3 which is also shown to be continuous and non-segmented. Wall plate 10 also includes an opening 10-5 which is configured to accommodate the user interface portion (e.g., outlet receptacles, electrical switch actuator, GFCI face, etc.) of an electrical wiring device. In this example, the opening 10-5 is depicted as a No. 26 opening.

Of course, there is no reason why the finish surface 10-3 cannot feature a matte finish. In addition, the finish surface 10-3 can also include other finishes as well. Moreover, wall plate 10, or the multi-gang wall plates described herein, can also be comprised of multiple finishes just as long as the latitudinal arc and the longitudinal arc that defines the latitudinal cross-section and a longitudinal cross-section are maintained. Reference is made to U.S. Pat. No. 7,586,040, which is incorporated herein by reference as though fully set forth in its entirety, for a more detailed explanation of a wall plate with a variety of finishes or multiple finishes.).

FIG. 2B is a longitudinal side elevation view of the wall plate 10, whereas FIG. 2C is a latitudinal side elevation view of wall plate 10. FIG. 2B shows that a longitudinal cross-section of the surface 10-3 is characterized by a swept longitudinal arc ($Arc_0$) of a circle having a radius ($r_0$) and a chord ($CHD_0$) that is substantially equal to a longitudinal dimension of the wall plate 10. (Stated differently, longitudinal arc ($Arc_0$) shown in the FIG. 2B follows or tracks the longitudinal profile of the finish surface 10-3). In one embodiment, the chord length $CHD_0$, and hence the height or longitudinal dimension of the single gang wall plate 10, is about 4.87 inches and the radius ($r_0$) is about 62.3 inches. The longitudinal chord length $CHD_0$ and the longitudinal radius ($r_0$) can be the same for multi-gang wall plates.

FIG. 2C shows that a latitudinal cross-section of the surface 10-3 is characterized by a swept latitudinal arc ($Arc_1$) of a circle having a radius ($r_1$) and a chord ($CHD_1$) that is substantially equal to a latitudinal dimension of the wall plate 10. (Stated differently, latitudinal arc ($Arc_1$) shown in the FIG. 2C follows or tracks the latitudinal profile of the finish surface 10-3). In one embodiment, the chord length $CHD_1$, and hence the width or latitudinal dimension of the single gang wall plate 10 is about 3.10 inches and the radius ($r_1$) is about 31.0 inches. The latitudinal chord length $CHD_1$ and the latitudinal radius ($r_1$) will be different for single gang plates and for each of the multi-gang wall plates. Thus, the radius ($r_1$) is a function of N, wherein N is an integer value greater than or equal to one. In one embodiment, wall plate 10 includes one or more removal openings 10-2 formed in a bottom portion of the wall plate wall 10-1. The removal openings 10-2 allow the wall plate 10 to be removed without the use of screws or other such fasteners.

In reference to FIG. 2D, a detail view of the perimeter wall portion 10-1 of the wall plate 10 is disclosed. The wall member 10-1 includes an upper wall portion 10-1-1 that has a substantially uniform width. The upper wall 10-1-1 may be normal to the finish surface or extend away from the finish surface at an oblique angle $\theta_1$ (wherein $1° \leq \theta_1 \geq 2°$). Using a small oblique angle $\theta_1$ tends to accentuate or draw attention to the first wall portion 10-1-1. The first wall portion 10-1-3 may include a small ledge or overhang 10-1-3 that extends a small distance inwardly toward the center of the wall plate 10. The overhang 10-1-3 is substantially parallel to the finish surface (but facing the opposite direction toward the wall surface). The second wall portion 10-1-2 is characterized by a reverse draft; i.e., it extends from the ledge 10-1-3 in an inward direction toward the finish surface 10-3 so that the wall plate surface that abuts the wall surface is under the upper wall 10-1-1 and possibly under the finish surface 10-3 so that it is substantially hidden from view (when the user looks at the installed wall plate head on or at an acute angle relative to the normal). The overhang 10-1-3 is another feature that tends to accentuate or draw attention to the first wall portion 10-1-1 and minimize the perceived thickness of the wall plate. The lower wall 10-1-2 typically extends from the overhang 10-1-3 toward (and under) the finish surface at an angle $\theta_2$ (wherein $5° \leq \theta_2 \geq 15°$).

In reference to FIG. 3A, an elevation view of the wall plate juxtaposed with a series of longitudinal cross-sectional views of the wall plate is disclosed. Sectional lines are shown in the elevation view and include sections taken from the right side of the wall plate to the middle thereof. The longitudinal radius ($r_0$) of each cross-sectional arc (A-A to E5-E5) is about 62.3 inches and therefore, each section forms an identical arc. The left side of the plate is the mirror image of the right side of the plate. Accordingly, even though the wall plate 10 consists of a single continuous surface, the radial finish surface will cause a light directed at the center of the wall plate to be reflected in a more diffuse (non-specular) way that users may find to be less glaring and gentler on the eye.

Figure 3B:
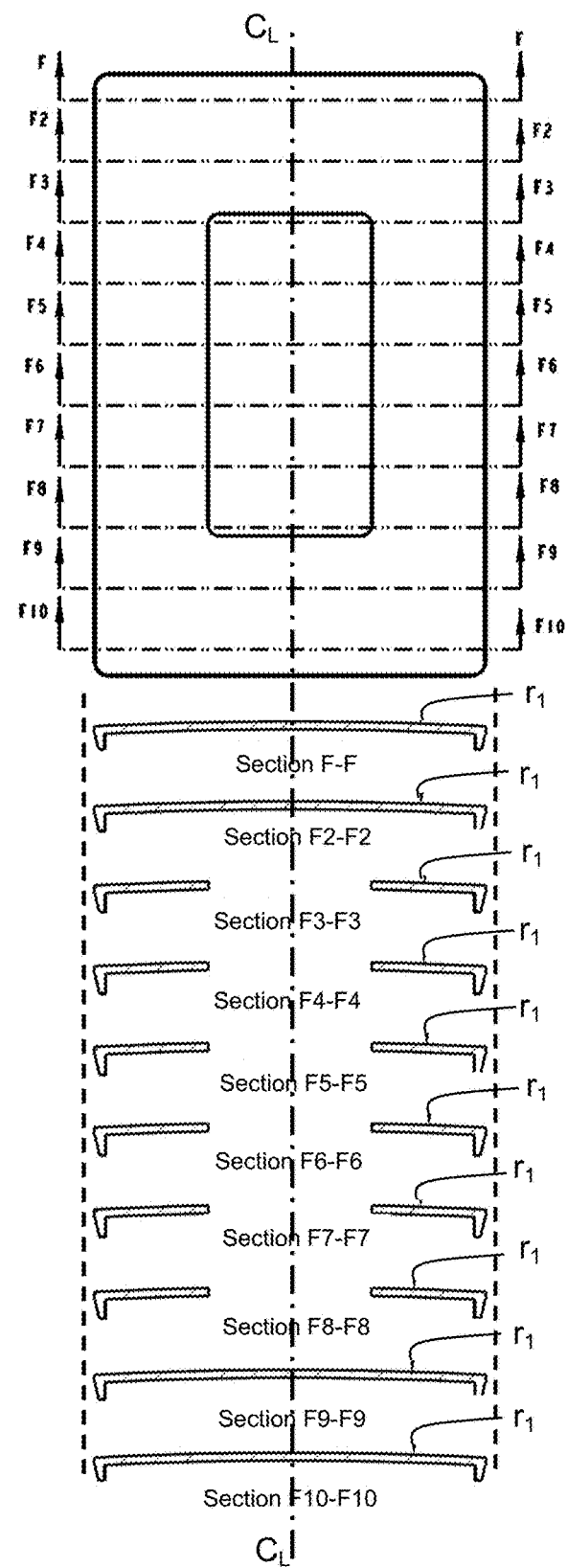
FIG. 3B includes an elevation view of the wall plate juxtaposed with a series of latitudinal cross-sectional views of the wall plate in accordance with an embodiment of the present invention.

In reference to FIG. 3B, an elevation view of the wall plate juxtaposed with a series of latitudinal cross-sectional views of the wall plate is disclosed. Sectional lines are shown in the elevation view and include latitudinal sections taken from the top to the bottom of the wall plate. The radius ($r_1$) of each latitudinal cross-sectional arc (F-F to F10-F10) is about 31.0 inches and therefore, each section forms an identical arc. As before, even though the wall plate 10 consists of a single continuous surface, the radial finish surface will cause a light directed at the center of the wall plate to be reflected in a more diffuse (non-specular) way that users may find to be less glaring and gentler on the eye. The light diffusing properties described in conjunction with FIGS. 3A and 3B are illustrated in FIGS. 4A and 4B described below.

Figure 4A:
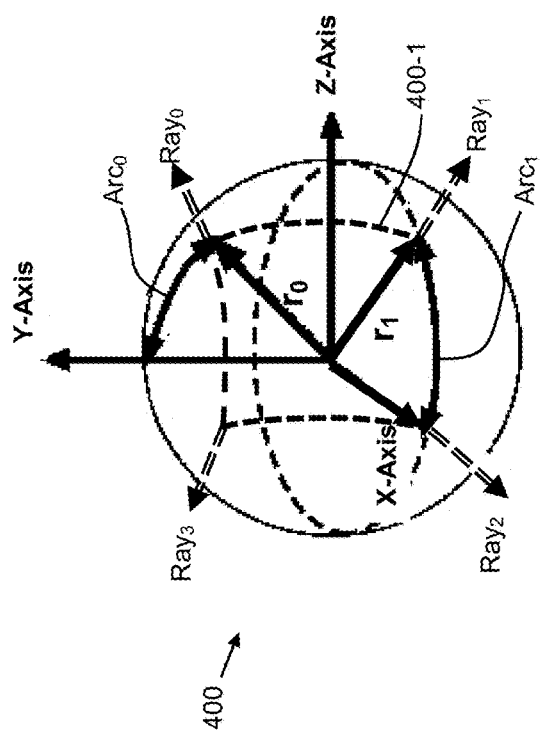
FIGS. 4A-4B are diagrammatic depictions of geometric shapes that may be used to select or design a finish surface of the wall plate in accordance with one or more embodiments of the present invention.
Figure 4B:
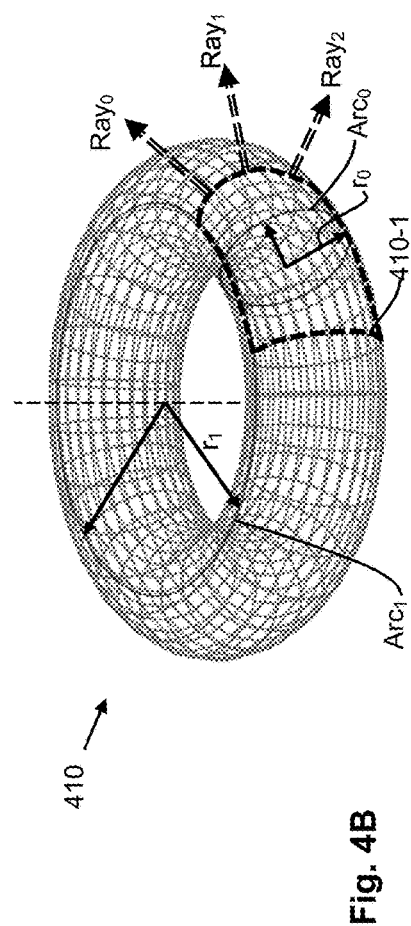

FIGS. 4A-4B are diagrammatic depictions of geometric shapes that may be used to select or design a finish surface 10-3 of the wall plate in accordance with one or more embodiments of the present invention. In reference to FIG. 4A, a finish surface 400-1 is depicted as a dashed line that forms a sector of the spherical shape 400 based on a selected longitudinal radius ($r_0$) and a latitudinal radius ($r_1$). The light diffusing properties are illustrated by four reflected light rays ($ray_0$-$ray_3$). In reference to FIG. 4B, a finish surface 410-1 is depicted as a dashed line that forms a sector of the torus 410. Here, the longitudinal radius ($r_0$) is the inner radius of the toroidal shape and the latitudinal radius ($r_1$) is the outer radius of the torus. The light diffusing properties are illustrated by three reflected light rays ($ray_0$-$ray_3$). When light is directed in a direction that is substantially normal to the center of finish surfaces 400-1 or 410-1, the reflected light rays produce a more diffuse glow rather than a hard, specular glare.

Referring back to FIGS. 2A-4B, those skilled in the art will appreciate that because of the radial latitudinal and longitudinal sections that characterize the wall plate 10, incident light that is reflected from the wall plate 10 will appear brighter at the center of the wall plate 10 and become more diffuse at the wall plate's walls. Thus, incident light will appear to highlight the user interface region formed by opening 10-5 and be diffuse elsewhere. In other words, since the longitudinal and latitudinal cross-sections are radial in nature, the intensity of the reflected light will fall off as the distance from the center line (in both directions) increases. This light diffusing feature of the wall plate 10 tends to produce a softer visual appearance; a glow rather than glare.

Figure 5B:
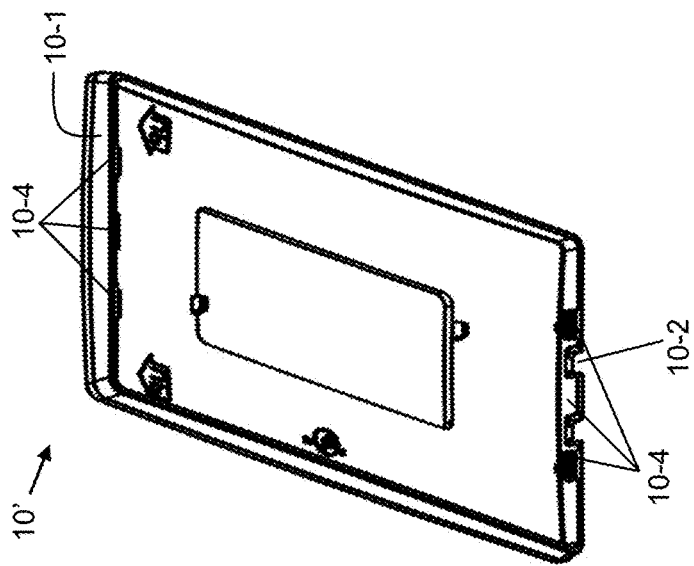
FIG. 5B is a rear isometric view of the wall plate depicted in FIG. 5A.
Figure 5A:
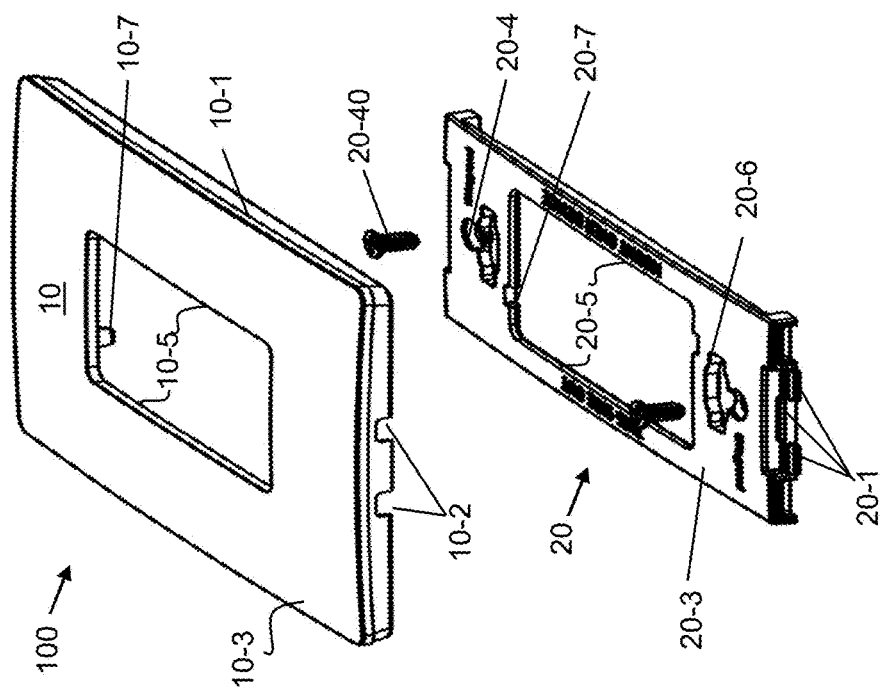
FIG. 5A is an isometric view of an electrical wiring device assembly in accordance with an embodiment of the present invention.

Referring to FIG. 5A, an isometric view of an electrical wiring device assembly 100 in accordance with an embodiment of the present invention is disclosed. The assembly 100 includes a wall plate 10 (See, e.g., FIGS. 2A-2D) and a subplate member 20. The wall plate 10 includes one or more removal openings 10-2 formed in a bottom portion of the wall plate wall 10-1 and a No. 26 opening 10-5 formed in the finish surface 10-3. As before, the wall member 10-1 includes an upper wall portion 10-1-1 that has a substantially uniform width and a bottom wall portion 10-1-2 that is characterized by a reverse draft. The wall plate 10 also includes an alignment tab 10-7 that is used to register and align the wall plate to the subplate 20 (by way of registration slot 20-7).

The subplate member 20 includes a main plate portion 20-3 that includes three alternating subplate fastener tabs 20-1 at each end thereof. The subplate fastener tabs 20-1 are configured to mate with corresponding wall plate fastener tabs 10-4 (See FIG. 5B) so that the wall plate 10 can be affixed to the subplate 20 without using screws. The subplate 20 also includes screw holes 20-4 for the screws 20-40 that are used to affix the subplate 20 to an electrical wiring device (not shown in this view), or alternatively, to a device box (also not shown in this view). A clearance opening 20-6 is formed between the screw hole 20-4 and the device opening 20-5. The clearance opening 20-6 provides clearance for the screws (30-1) used to affix the electrical wiring device to the device box (not shown in this view). The subplate 20 includes an opening 20-5 which is configured to accommodate the user interface portion (e.g., outlet receptacles, electrical switch actuator, GFCI face, etc.) of an electrical wiring device. Opening 20-5 corresponds to, or may be slightly larger than, the opening 10-5 formed in the wall plate 10.

Referring to FIG. 5B, a rear isometric view of the wall plate 10 depicted in FIG. 5A is disclosed. Two alternating wall plate fastener tabs 10-4 are shown formed in the interior of the wall plate wall 10-1 and at each end of the wall plate 10. As noted above, the wall plate fastener tabs 10-4 are configured to mate with subplate fastener tabs 20-1 to affix the wall plate 10 to the subplate 20 without using screws or similar fasteners. Plate removal openings 10-4 are disposed between each wall plate fastener tab 10-4; the plate removal openings 10-4 accommodate a screw driver or some other tool that may be used to pry the wall plate 10 off of the subplate 20.

Referring to FIGS. 6A-6D, various views of the subplate depicted in FIG. 5A in accordance with an embodiment of the present invention are disclosed. FIG. 6A is an elevation view of the top surface of the subplate 20 and shows the subplate fastener tabs 20-1, screw holes 20-4 and clearance opening 20-6 at each end thereof. The wiring device opening 20-5 is also shown in this view. FIG. 6C is an elevation view of the rear surface of the subplate 20 and shows the same elements.

FIG. 6B is a longitudinal side elevation view and FIG. 6D is a latitudinal side elevation view, respectively, of the subplate 20 depicted in FIG. 6A. These views show that subplate 20 essentially conforms to the shape of the interior surface of the wall plate 10 (See FIGS. 2B and 2C). Thus, FIG. 6B shows that a longitudinal cross-section of the surface 20-3 is characterized by a longitudinal arc ($Arc_{O'}$) that is formed by the radius ($r_{O'}$) of a circle that is about the same as what is shown in FIG. 2B. (About the same means that the longitudinal arc ($Arc_{O'}$) should substantially conform to the interior surface of the wall plate). FIG. 6D shows a latitudinal cross-section of the surface 20-3 is characterized by a swept latitudinal arc ($Arc_{1'}$) that is formed by the radius ($r_{1'}$) of a circle that is about the same as what is shown in FIG. 2C (so that the latitudinal arc ($Arc_{1'}$) substantially conforms to the interior surface of the wall plate).

Figure 7A:
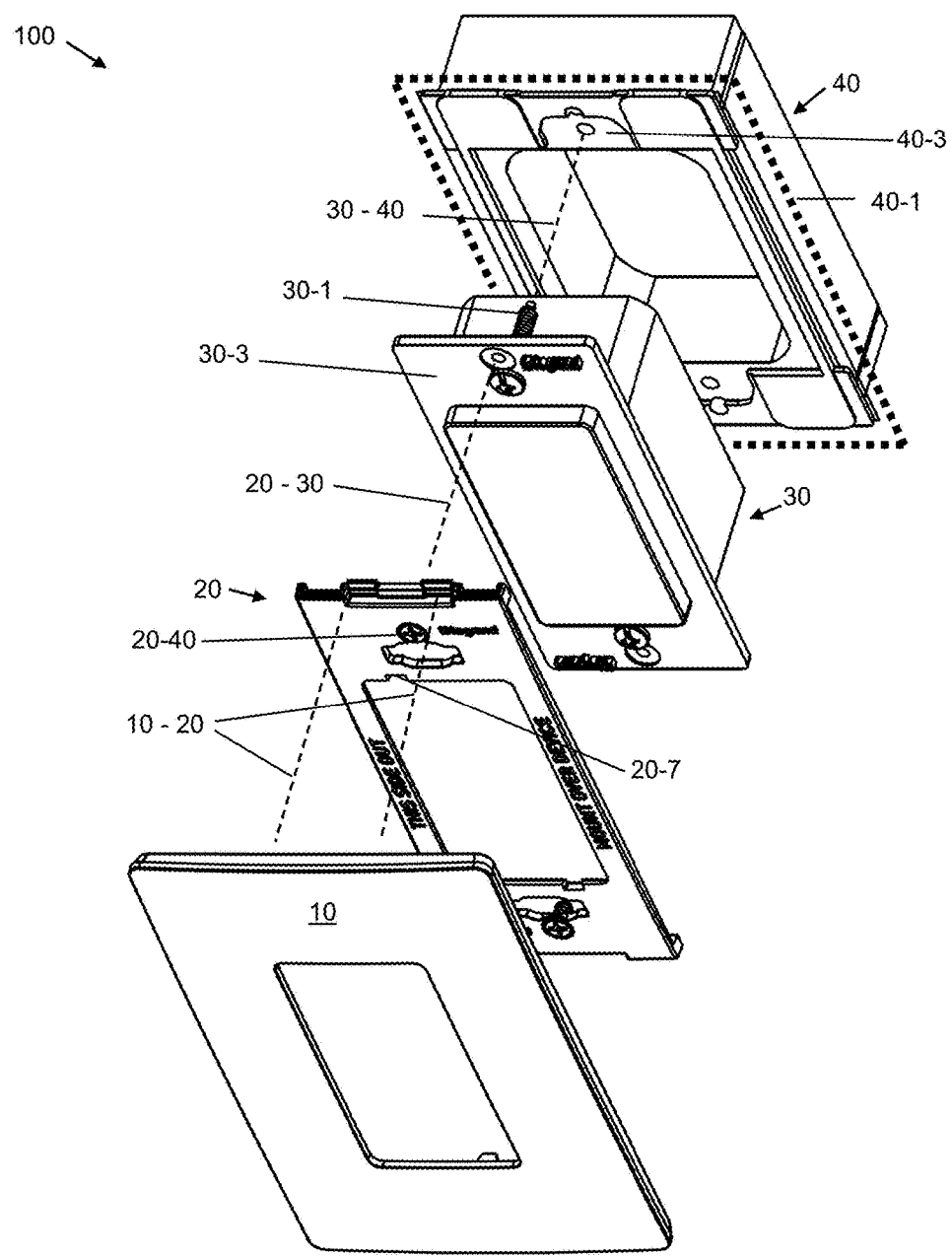
FIG. 7A is an exploded view of an electrical wiring device assembly in accordance with an embodiment of the present invention.

In reference to FIG. 7A, an exploded view of an electrical wiring device assembly 100 in accordance with an embodiment of the present invention is disclosed. The device box 40 (or wall box as it is sometimes referred to by those skilled in the art) is typically attached to one of the framing studs (not shown for sake of clarity in this view). Subsequently, a layer of sheetrock—or some other material—is placed over the framing studs with a device box opening 40-1 formed therein. (In an old-work installation, an opening 40-1 is formed in an existing wall surface and the wall box 40 is attached to the wall surface). After this, an electrician connects the terminals of the electrical wiring device 30 to their respective hot and neutral conductors (also not shown in this view for the sake of clarity) and attaches the wiring device 30 to the wall box 40 by way of fasteners 30-1. (The fasteners 30-1 extend through screw holes formed in the ground strap 30-3). Once the electrical wiring device 30 is installed, the subplate 20 is affixed to the wiring device 30 via fasteners 20-40. The wall plate 10 is snapped onto the subplate 20 by aligning the wall plate alignment tab 10-7 (not visible in this view) with the subplate alignment register 20-7 and pressing the fastener tabs 10-4 into the subplate fastener tabs 20-1.

Figure 7B:
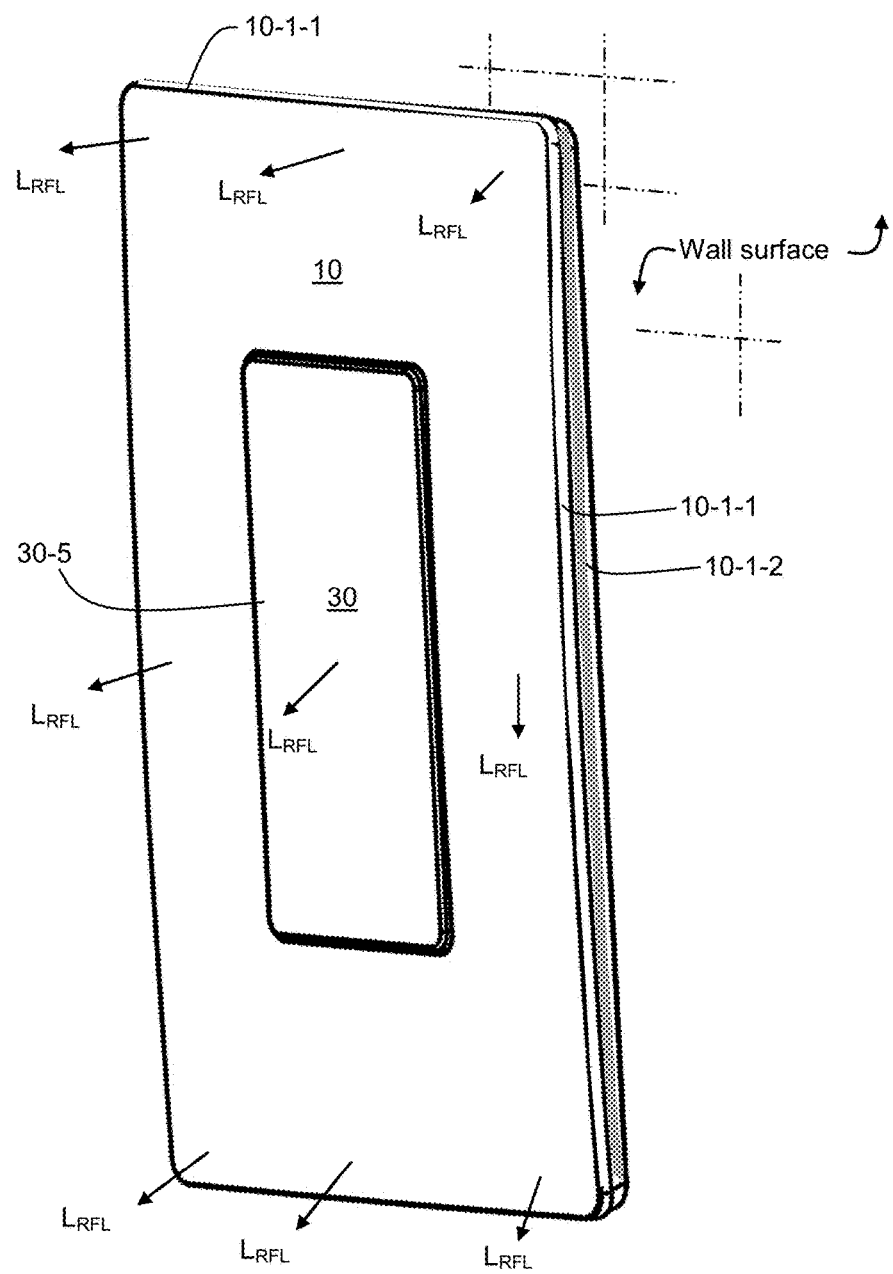
FIG. 7B is a perspective view of the assembled and installed electrical wiring device assembly depicted in FIG. 7A.

Referring to FIG. 7B, a perspective view of the assembled and installed electrical wiring device assembly depicted in FIG. 7A is disclosed. When the wall plate 10 is installed in an assembly 100, the user will typically notice only the relatively thin first wall portion 10-1-1 because the second wall portion 10-1-2 extends underneath the first wall (and the finish surface in some embodiments) and cannot easily be seen by the user when the viewing angle is relatively small (0° is straight on and 90° is a profile view). As the viewing angle increases, the second wall portion 10-1-2 will become more visible, but it is still in the shadows so that the user tends to notice the first wall portion 10-1-1. Moreover, since the second wall portion abuts the wall surface (upon and after installation) at a place where it cannot be seen by the user, the user typically will not notice any existing unevenness in the wall surface (unless the installed wall plate is closely inspected). Thus, the first wall tends to minimize the perceived thickness of the wall plate, and the reverse draft of the second wall tends to hide or minimize the appearance of uneven wall surfaces.

Note also that the light ($L_{RFL}$) reflected from the wall plate 10 falls off as a function of the longitudinal arc ($Arc_O$) and latitudinal arc ($Arc_1$) as the distance from the user interface 30-5 center increases. Thus, the ambient light tends to highlight and draw attention to the user interface (rather than the wall plate).

In reference to FIGS. 8A-8C, various views of the electrical wiring device assembly 100 depicted in FIG. 7 are disclosed. FIG. 8A is a front elevation view of the electrical wiring assembly of FIG. 7. A longitudinal sectional line V-V cuts through the assembly 100 at substantially a central portion of the electrical wiring device 30 and the wall plate 10. The cross-section V-V is shown in FIG. 8B. The interior components of the device box 40—including the electrical wiring device components—are omitted (shaded) for the sake of clarity. The detail view of the device box 40, wiring device 30, subplate 20 and wall plate 10 interconnections are shown at FIG. 8C.

In FIG. 8C, the device box 40 is disposed within a cavity formed in the wall interior and accessible via a wall box opening 40-1. The ground strap 30-3 of the electrical wiring device 30 abuts device box 40 and the wall surface, and the wiring device fasteners 30-1 extend through the ground strap 30-3, the device box ground plate 40-3, and into the wall interior. The subplate 20 includes a clearance opening 20-6 that accommodates the head of the fastener 30-1. The subplate screw 20-40 is employed to affix the subplate 20 to the ground strap 30-3 of the electrical wiring device 30. As noted previously, the screwless fastener 10-4 mates with the subplate fastener tab 20-1 to affix the wall plate 10 to the subplate 20.

Figure 9F:
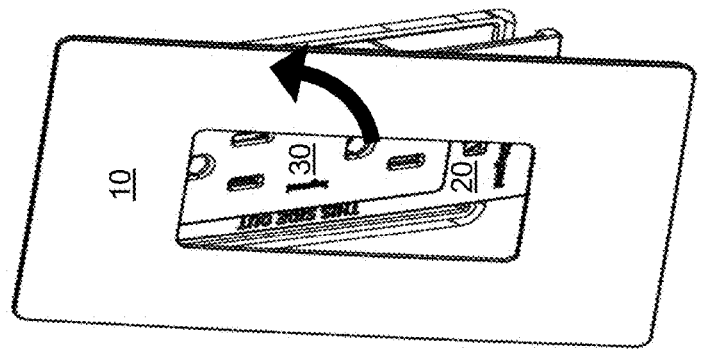
Figure 9E:
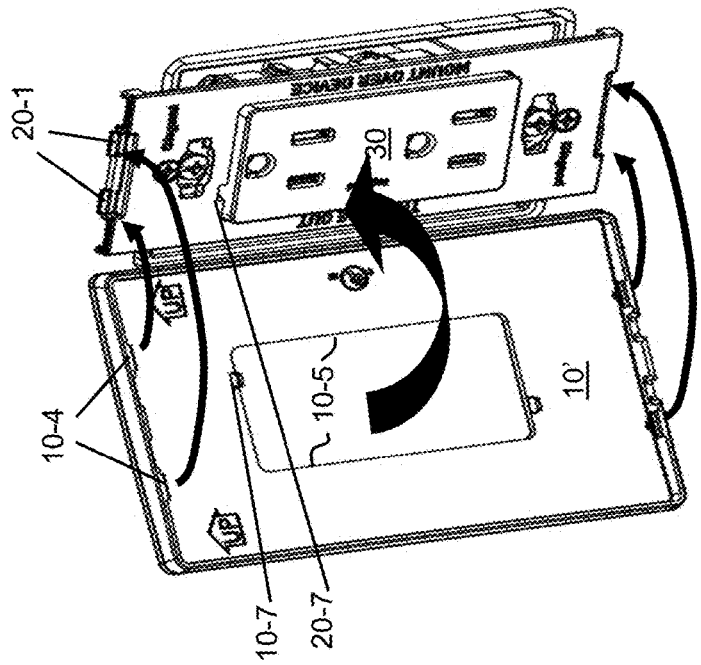
Figure 9D:
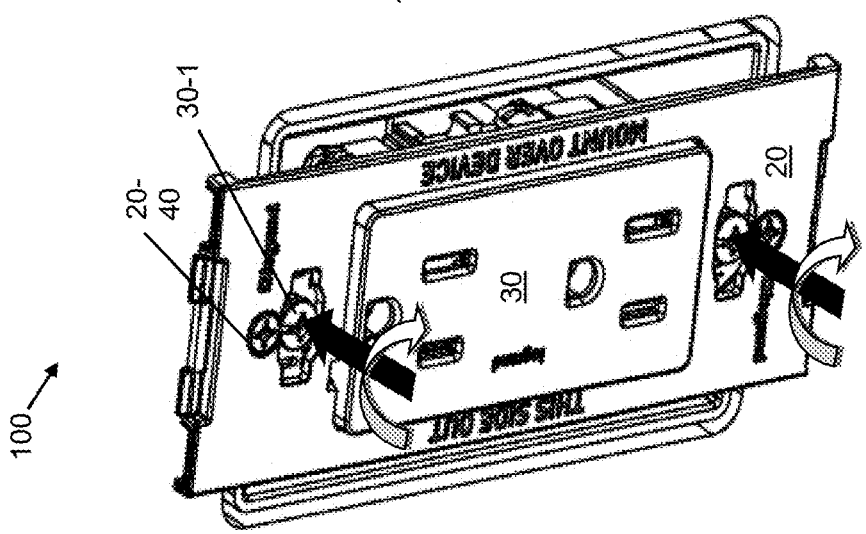

Referring to FIGS. 9A-9F, an assembly sequence for the electrical wiring device assembly depicted in FIG. 7 is disclosed. Referring to FIG. 9A, an isometric view of the electrical wiring device 30 and the device box 40 is shown. Specifically, a screw driver (not shown) is employed to loosen the fasteners 30-1 for clearance purposes. In FIG. 9B, the subplate 20 is placed over top of the electrical wiring device 30 so that the electrical wiring device user interface 30-5 protrudes into the central opening 20-5 of the subplate 20, the loosened fasteners 30-1 are inserted into the clearance openings 20-6 and the subplate fasteners 20-40 are inserted into the screw holes 30-2-1 formed in the "mickey mouse" ears of the wiring device 30. In FIG. 9C, the subplate screws 20-40 are tightened so that the subplate 20 is tightly affixed to the electrical wiring device 30. Because the wiring device fasteners 30-1 were loosened in FIG. 9A, they are re-tightened in FIG. 9D so that the electrical wiring device 30 tightly abuts the device box 40. In FIG. 9E, the wall plate 10 is rotated toward the subplate 20 so that the wall plate alignment tab 10-7 is aligned with the subplate register opening 20-7, and the wall plate screwless faster tabs 10-4 are aligned with the subplate screwless fastener tabs 20-1. In FIG. 9F, the installer snaps the wall plate 10 onto the subplate 20 so that the fastener tabs (10-4, 20-1) mate with each to thus affix the wall plate 10 to the subplate 20.

Figure 9G:
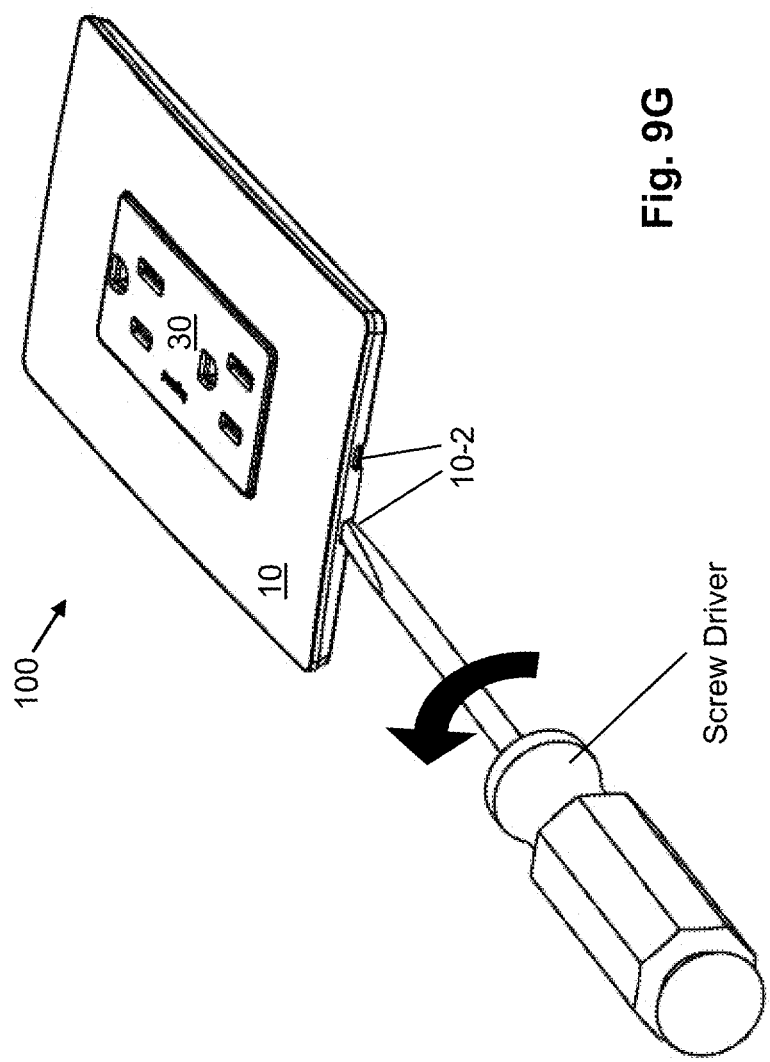
FIG. 9G is an isometric view illustrating a step of removing the wall plate from the electrical wiring device assembly depicted in FIG. 7.

In reference to FIG. 9G, an isometric view illustrating the step of removing the wall plate from the electrical wiring device assembly is disclosed. When the wall plate 10 is coupled to the subplate, the user need only insert the flat head of the screw driver into the removal openings 10-2 and pry the cover 10 off of the subplate 20 in the manner shown.

As embodied herein and depicted in FIGS. 10A-10C, various view of a wall plate 1000 in accordance with another embodiment of the present invention are disclosed. To be specific, the wall plate 1000 is a two gang wall plate and includes all of the elements, features and benefits of the single gang wall plate 10 described above.

FIG. 10A is a front elevation view of a two gang wall plate 1000. Wall plate 1000 includes finish surface 1000-3 which is shown as being continuous and non-segmented. Finish surface 1000-3 may be relatively smooth or may feature a matte finish. Wall plate 1000 also includes two openings 1000-5 which are configured to accommodate the user interface portion of an electrical wiring device. In this example, the openings 1000-5 are depicted as No. 26 openings.

FIG. 10B is a longitudinal side elevation view of the wall plate 1000 whereas FIG. 10C is a latitudinal side elevation view of wall plate 1000. FIG. 10B shows that a longitudinal cross-section of the surface 1000-3 is characterized by a swept longitudinal arc ($Arc_0$) of a circle having a radius ($r_0$) and a chord ($CHD_0$) that is substantially equal to the longitudinal dimension of the wall plate 1000. In one embodiment, the chord length $CHD_0$, and hence the height or longitudinal dimension of the two gang wall plate 10 is about 4.87 inches and the radius ($r_0$) is about 62.3 inches. The longitudinal chord length $CHD_0$ and the longitudinal radius ($r_0$) for multi-gang wall plates, such as the one depicted in FIG. 10A, can be the same for a single gang wall plate 10 (See FIGS. 2A-C).

FIG. 10C shows a latitudinal cross-section of the surface 1000-3 that is characterized by a swept latitudinal arc ($Arc_{12}$) of a circle having a radius ($r_{12}$) and a chord ($CHD_{12}$) that is substantially equal to a latitudinal dimension of the wall plate 1000. In one embodiment, the chord length $CHD_{12}$, and hence the width or latitudinal dimension of the two gang wall plate 10 is about 4.912 inches and the radius ($r_{12}$) is about 76.9 inches. (The latitudinal chord length $CHD_{12}$ and the latitudinal radius ($r_{12}$) of the two gang wall plate will be different than those of the single gang plates and for the other multi-gang wall plates). Thus, the radius ($r_{12}$) is a function of N, wherein N is an integer value greater than or equal to one. In one embodiment, wall plate 1000 includes one or more removal openings 1000-2 formed in a bottom portion of the wall plate wall 1000-1; the openings 1000-2 allow the wall plate 1000 to be removed without the use of screws or other such fasteners.

Figure 10D:
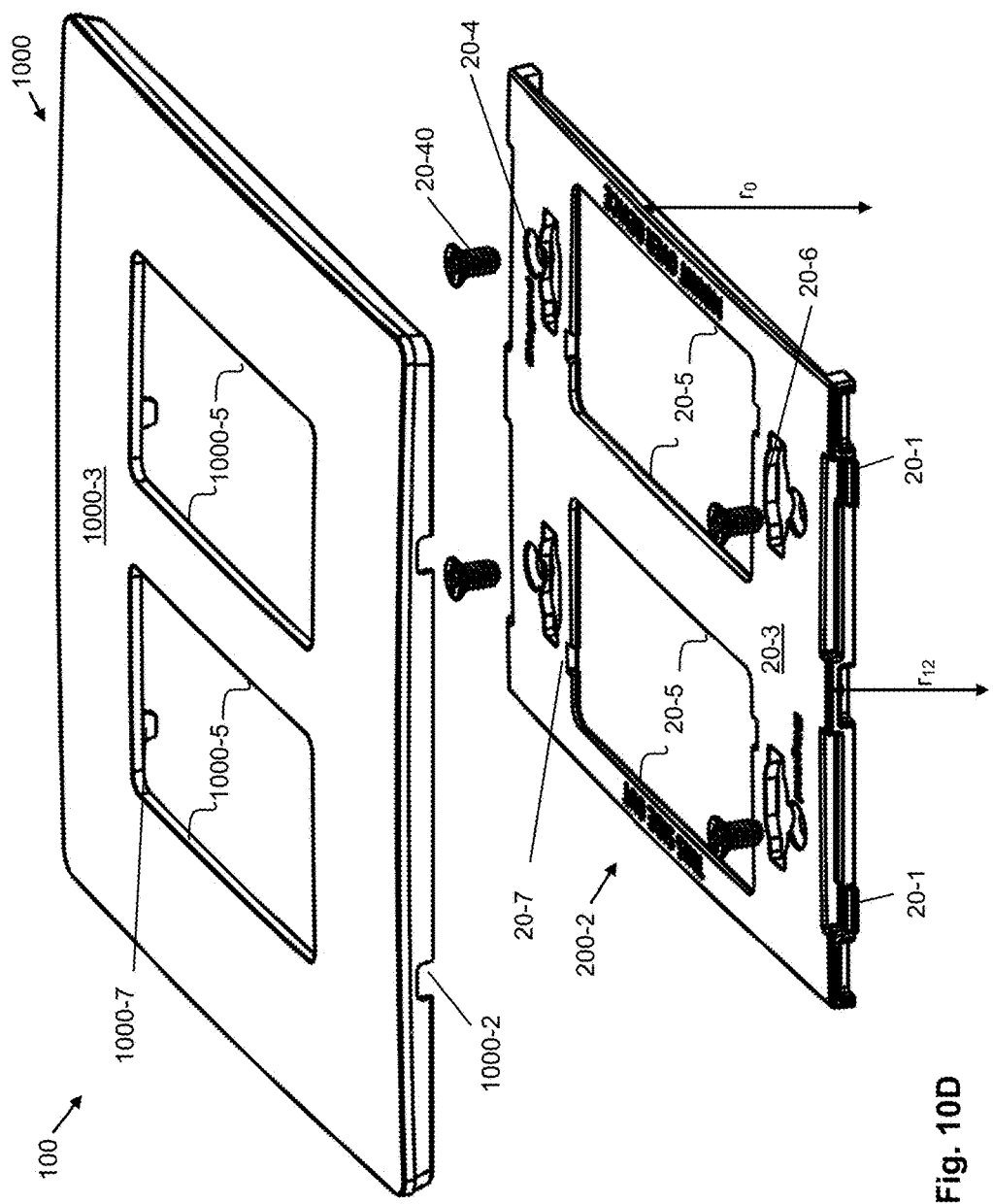
FIG. 10D is an isometric view of an electrical wiring device assembly using the wall plate depicted in FIGS. 10A-10C.

Referring to FIG. 10D, an isometric view of an electrical wiring device assembly 100 including the wall plate 1000 (FIGS. 10A-10C) and a subplate member 200-2 is disclosed. As before, the wall member 1000-1 includes an upper wall portion 10-1-1 that has a substantially uniform width and a bottom wall portion 1000-1-2 that is characterized by a reverse draft. The wall plate 1000 also includes an alignment tab 1000-7 that is used to register and align the wall plate to the subplate 200-2.

The subplate member 200-2 includes a main plate portion 20-3 that includes three alternating subplate fastener tabs 20-1 at each end thereof. The subplate fastener tabs 20-1 are configured to mate with corresponding wall plate fastener tabs 1000-4 so that the wall plate 1000 can be affixed to the subplate 200-2 without using screws. The subplate 200-2 also includes screw holes 20-4 for the screws 20-40 that are used to affix the subplate 200-2 to electrical wiring devices (not shown in this view) or, alternatively, to a device box (also not shown in this view). A clearance opening 20-6 is formed between the screw hole 20-4 and the device openings 20-5. The clearance opening 20-6 provides clearance for the screws (30-1) used to affix the electrical wiring device to the device box (not shown in this view). The subplate 200-2 includes openings 20-5, each of which are configured to accommodate the user interface portion (e.g., outlet receptacles, electrical switch actuator, GFCI face, etc.) of an electrical wiring device. Openings 20-5 correspond to, or may be slightly larger than, the openings 1000-5 formed in the wall plate 1000.

As embodied herein and depicted in FIGS. 11A-11C, various view of a wall plate 1100 in accordance with another embodiment of the present invention are disclosed. To be specific, the wall plate 1100 is a three gang wall plate and includes all of the elements, features and benefits of the single and two gang wall plates described above.

FIG. 11A is a front elevation view of a three gang wall plate 1100. Wall plate 1100 includes finish surface 1100-3 that includes three openings 1100-5 which are configured to accommodate three electrical wiring devices. In this example, the openings 1100-5 are depicted as No. 26 openings.

FIG. 11B is a longitudinal side elevation view of the wall plate 1100 whereas FIG. 11C is a latitudinal side elevation view of wall plate 1100. FIG. 11B shows that a longitudinal cross-section of the surface 1100-3 is characterized by a swept longitudinal arc ($Arc_0$) of a circle having a radius ($r_0$) and a chord that is substantially equal to a longitudinal dimension of the wall plate 1100. (The chord is not shown in this view). Again, the longitudinal chord length $CHD_0$ and the longitudinal radius ($r_0$) for multi-gang wall plates, such as the one depicted in FIG. 11A, can be the same for a single gang wall plate 10 (See, e.g., FIGS. 2A-C).

FIG. 11C shows a latitudinal cross-section of the surface 1100-3 that is characterized by a swept latitudinal arc ($Arc_{13}$) of a circle having a radius ($r_{13}$) and a chord ($CHD_{13}$) that is substantially equal to a latitudinal dimension of the wall plate 1100. In one embodiment, the width or latitudinal dimension of the three gang wall plate 10 is about 6.774 inches and the radius ($r_{13}$) is about 143.4 inches.

Figure 11D:
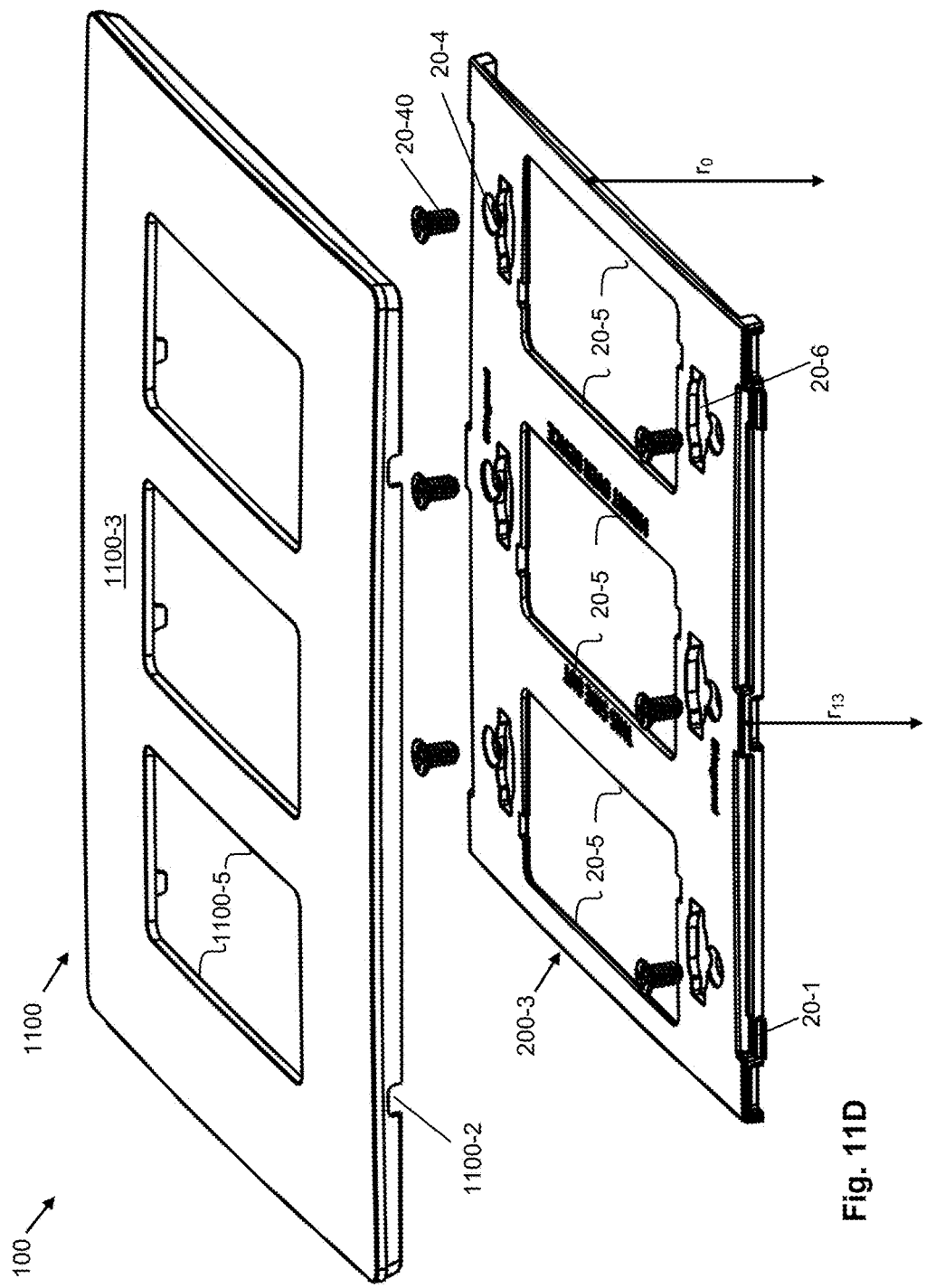
FIG. 11D is an isometric view of an electrical wiring device assembly using the wall plate depicted in FIGS. 11A-11C.

Referring to FIG. 11D, an isometric view of an electrical wiring device assembly 100 including a wall plate 1100 (FIGS. 11A-11C) and a subplate member 200-3 is disclosed. The wall plate 1100 is identical to the wall plate 1000 (FIGS.

10A-10C). Since wall plate 1100 is a three gang plate, wall plate 1100 includes three openings 1100-5, instead of two openings. The subplate member 200-3 is similar to subplate 200-2 (FIG. 10D); the difference being that subplate 200-3 includes three openings 20-5.

As embodied herein and depicted in FIGS. 12A-12C, various view of a wall plate 1200 in accordance with another embodiment of the present invention are disclosed. Wall plate 1200 is a four gang wall plate and includes all of the elements, features and benefits of the wall plates described above and thus any additional description would be redundant and repetitive.

FIG. 12A is a front elevation view of a four gang wall plate 1200. Wall plate 1200 includes a finish surface 1200-3 that includes four openings 1200-5 which are configured to accommodate the user interface portion of four electrical wiring devices. In this example, the openings 1200-5 are depicted as No. 26 openings.

FIG. 12B is a longitudinal side elevation view of the wall plate 1200 whereas FIG. 12C is a latitudinal side elevation view of wall plate 1200. FIG. 11B shows that a longitudinal cross-section of the surface 1200-3 is characterized by a swept longitudinal arc ($Arc_0$) of a circle having a radius ($r_0$) and a chord that is substantially equal to a longitudinal dimension of the wall plate 1200. In one embodiment, the height or longitudinal dimension of the four gang wall plate 1200 is about 4.87 inches and the radius ($r_0$) is about 62.3 inches.

FIG. 12C shows a latitudinal cross-section of the surface 1200-3 that is characterized by a swept latitudinal arc ($Arc_{14}$) of a circle having a radius ($r_{14}$) and a chord ($CHD_{14}$) that is substantially equal to a latitudinal dimension of the wall plate 1200. In one embodiment, the width or latitudinal dimension of the four gang wall plate 10 is about 8.586 inches and the radius ($r_{14}$) is about 230.4 inches.

Figure 12D:
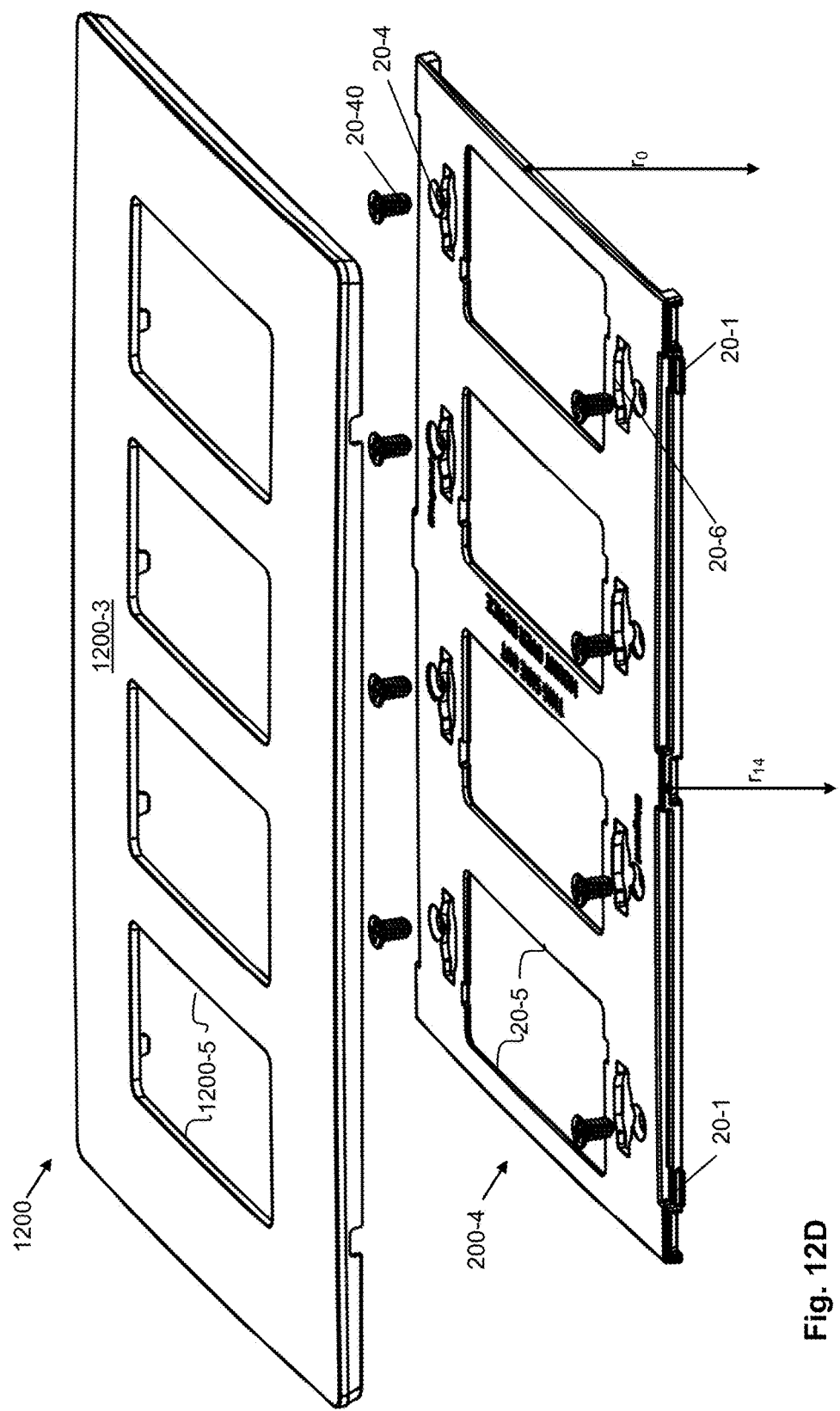
FIG. 12D is an isometric view of an electrical wiring device assembly using the wall plate depicted in FIGS. 12A-12C.

Referring to FIG. 12D, an isometric view of an electrical wiring device assembly 100 is shown to include a wall plate 1200 (See, e.g., FIGS. 10A-10D) and a subplate member 200-4. The wall plate 1200 includes four openings 1200-5, and the subplate member 200-4 includes four openings 20-5. Again, the wall plate 1200 and the subplate 200-4 include all of the elements, features and benefits of the systems 100 described above and thus any additional description would be redundant and repetitive.

As embodied herein and depicted in FIGS. 13A-13C, various view of a wall plate 1300 in accordance with another embodiment of the present invention are disclosed. Wall plate 1300 is a five gang wall plate and includes all of the elements, features and benefits of the wall plates described above.

FIG. 13A is a front elevation view of a five gang wall plate 1300. Wall plate 1300 includes a finish surface 1300-3 having five openings 1300-5 that are configured to accommodate the user interface portions of five electrical wiring devices. In this example, the five openings 1300-5 are depicted as No. 26 openings.

FIG. 13B is a longitudinal side elevation view of the wall plate 1300 whereas FIG. 13C is a latitudinal side elevation view of wall plate 1300. FIG. 13B shows that a longitudinal cross-section of the surface 1300-3 is characterized by a swept longitudinal arc ($Arc_0$) of a circle having a radius ($r_0$) and a chord that is substantially equal to a longitudinal dimension of the wall plate 1300.

FIG. 13C shows a latitudinal cross-section of the surface 1300-3 that is characterized by a swept latitudinal arc ($Arc_{15}$) of a circle having a radius ($r_{15}$) and a chord ($CHD_{15}$) that is substantially equal to a latitudinal dimension of the wall plate 1300. As before, the radius ($r_{15}$) and the chord length $CHD_{15}$ are functions of N, the number of gangs. (In one embodiment, the width or latitudinal dimension of the five gang wall plate 10 is about 10.938 inches and the radius ($r_{15}$) is about 333.9 inches.).

Figure 13D:
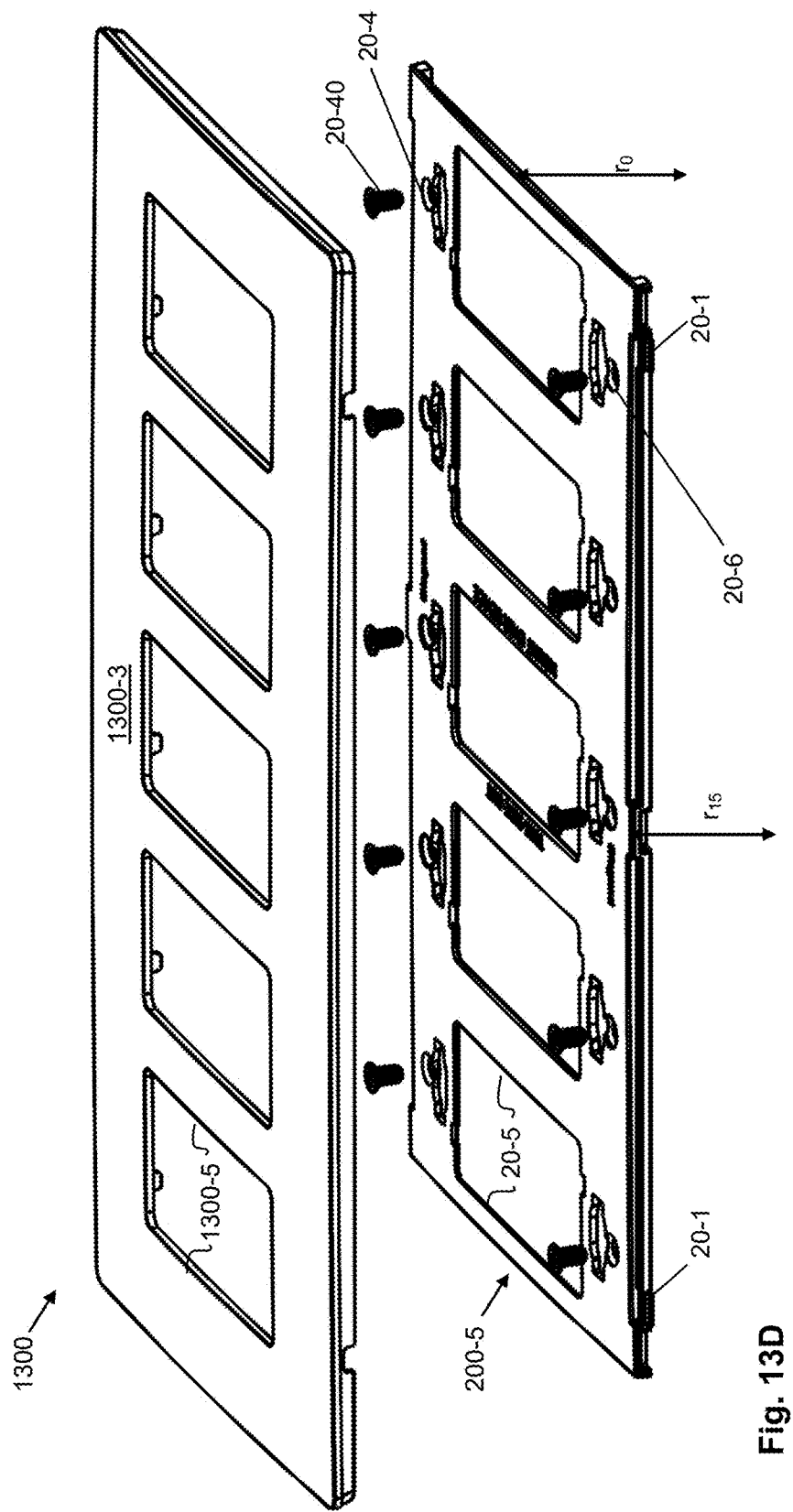
FIG. 13D is an isometric view of an electrical wiring device assembly using the wall plate depicted in FIGS. 13A-13C.

Referring to FIG. 13D, an isometric view of an electrical wiring device assembly 100 that includes the wall plate 1300 and a subplate member 200-5 is disclosed. The wall plate 1300 includes five openings 1300-5 and the subplate member 200-5 includes five openings 20-5. As before, the wall plate 1300 and the subplate 200-5 include all of the elements, features and benefits of the systems 100 described above and thus any additional description would be redundant and repetitive.

As embodied herein and depicted in FIGS. 14A-14C, various view of a wall plate 1400 in accordance with another embodiment of the present invention are disclosed. Wall plate 1400 is a six gang wall plate and includes all of the elements, features and benefits of the wall plates described above.

FIG. 14A is a front elevation view of a six gang wall plate 1400. Wall plate 1400 includes a finish surface 1400-3 that includes six openings 1400-5 which are configured to accommodate the user interface portion (e.g., outlet receptacles, electrical switch actuator, GFCI face, etc.) of six electrical wiring devices. In this example, the openings 1400-5 are depicted as No. 26 openings.

FIG. 14B is a longitudinal side elevation view of the wall plate 1400 whereas FIG. 14C is a latitudinal side elevation view of wall plate 1400. FIG. 14B shows that a longitudinal cross-section of the surface 1400-3 is characterized by a swept longitudinal arc ($Arc_0$) of a circle having a radius ($r_0$) and a chord that is substantially equal to a longitudinal dimension of the wall plate 1400. FIG. 14C shows a latitudinal cross-section of the surface 1400-3 that is characterized by a swept latitudinal arc ($Arc_{16}$) of a circle having a radius ($r_{16}$) and a chord ($CHD_{16}$) that is substantially equal to a latitudinal dimension of the wall plate 1400. (In one embodiment, the width or latitudinal dimension of the three gang wall plate 10 is about 12.210 inches and the radius ($r_{16}$) is about 465.9 inches).

Figure 14D:
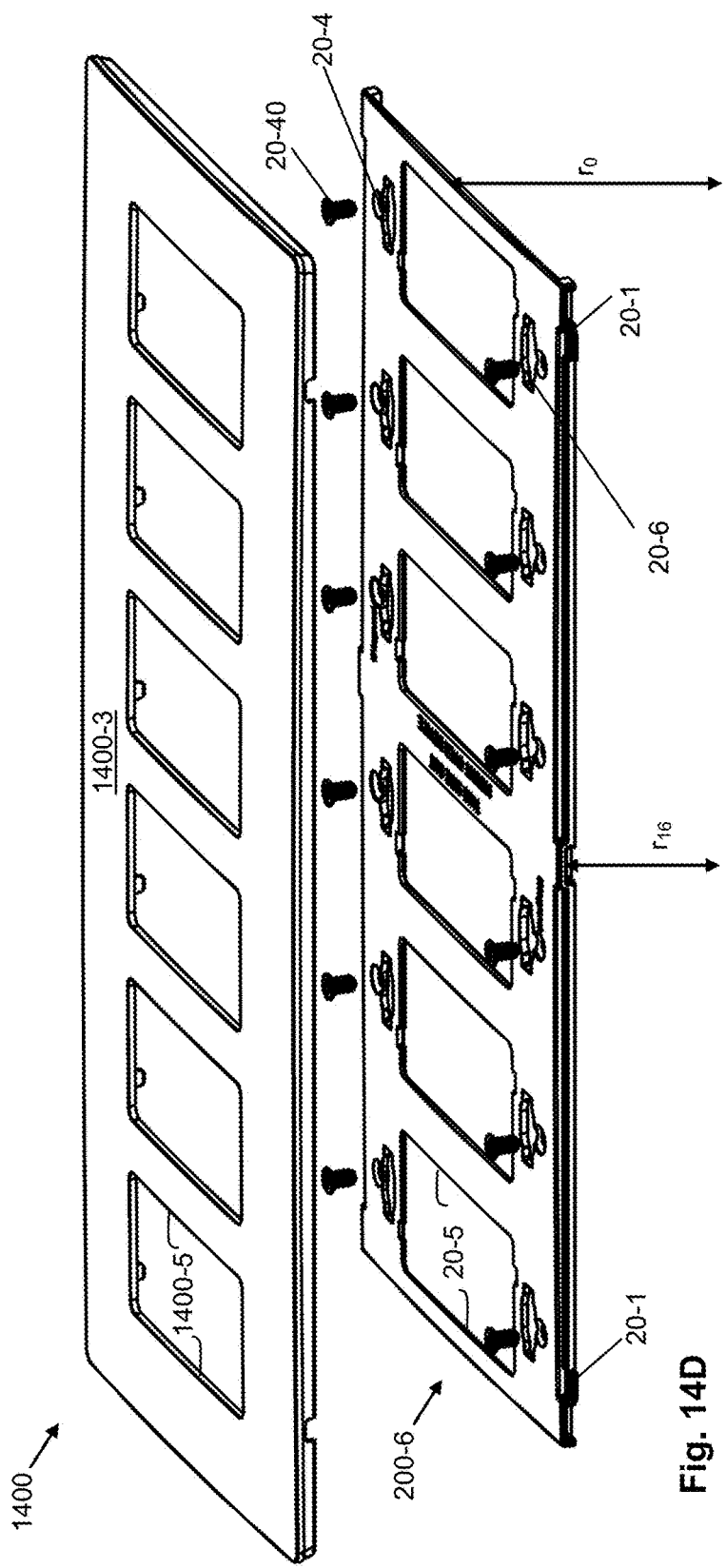
FIG. 14D is an isometric view of an electrical wiring device assembly using the wall plate depicted in FIGS. 14A-14C.

Referring to FIG. 14D, an isometric view of an electrical wiring device assembly 100 that includes a wall plate 1400 (See, e.g., FIGS. 10A-10D) and a subplate member 200-6 is disclosed. The wall plate includes six openings 1400-5 and the subplate member 200-6 also includes six openings 20-5. Once again, the wall plate 1400 and the subplate 200-6 include all of the elements, features and benefits of the systems 100 described above and thus any additional description would be redundant and repetitive.

Referring to FIG. 15, an isometric view of a No. 1 wall plate in accordance with another embodiment of the present invention is disclosed. Like the single gang embodiment of FIG. 2B, wall plate 1500 has a longitudinal cross-section of its finish surface 1500-3 that is characterized by a swept longitudinal arc of a circle having a predetermined radius (e.g., $r_0$) and a chord (e.g., $CHD_0$) that is substantially equal to a longitudinal dimension of the wall plate 1500. Similarly, wall plate 1500 has a latitudinal cross-section of the surface 1500-3 that is characterized by a swept latitudinal arc ($Arc_1$) of a circle having a predetermined radius (e.g., $r_1$) and a chord (e.g., $CHD_1$) that is substantially equal to a latitudinal dimension of the wall plate 1500. As before, the wall member 1500-1 includes an upper wall portion 1500-1-1 that has a substantially uniform width and a bottom wall portion 1500-1-2 that is characterized by a reverse draft. See FIG. 2D and the associated text above. The wall plate opening 1500-5 is commonly referred to as a No. 1 opening and is configured to accommodate a toggle switch actuator.

Referring to FIG. 16, an isometric view of a No. 8 wall plate in accordance with an embodiment of the present invention. Like the single gang embodiment of FIG. 2B, wall plate 1600 also has a longitudinal cross-section of its finish surface 1600-3 that is characterized by a swept longitudinal arc of a circle having a predetermined radius (e.g., $r_0$) and a chord (e.g., $CHD_0$) that is substantially equal to a longitudinal dimension of the wall plate 1500. Similarly, wall plate 1600 has a latitudinal cross-section of the surface 1600-3 that is characterized by a swept latitudinal arc ($Arc_1$) of a circle having a predetermined radius (e.g., $r_1$) and a chord (e.g., $CHD_1$) that is substantially equal to a latitudinal dimension of the wall plate 1500. Again, the wall member 1600-1 includes an upper wall portion 1600-1-1 that has a substantially uniform width and a bottom wall portion 1600-1-2 that is characterized by a reverse draft. See FIG. 2D and the associated text above. The wall plate openings 1600-5 are commonly referred to as a No. 8 opening because both openings together resemble the number eight (8). These openings are configured, of course, to accommodate a pair of outlet receptacles.

As those of ordinary skill in the art will appreciate, the wall plates (10, and 1000-1600) of the present invention may be adapted for use with any kind of electrical wiring device. Reference is made to U.S. Pat. No. 8,243,402, which is incorporated herein by reference as though fully set forth in its entirety, for a more detailed explanation of electrical switches, dimmers, outlet receptacles, timers, fan control devices, GFCIs, AFCIs, a blank, a night light, an occupancy sensor, vacancy sensor or any combination thereof. The '402 patent discloses, e.g., outlet receptacles at FIGS. 1-18 and the associated text. The '402 patent discloses a timer mechanism an occupancy sensor and a thermostat at FIGS. 1A and 1B, and the associated text. The '402 patent shows GFCI devices at FIGS. 22-29 and the associated text. The '402 patent shows an AFCI circuit at FIG. 30 and the associated text. The '402 patent shows a TVSS circuit at FIG. 31 and the associated text. A combination GFCI and light/night light is shown at FIG. 32 and the associated text. With respect to electrical switches, the '402 patent discloses a toggle switch mechanism at FIGS. 32-46 and the associated text, a pull switch mechanism at FIGS. 47-49 and the associated text, a rocker switch mechanism at FIGS. 50-56 and the associated text, and paddle switch mechanisms at FIGS. 75-79 and the related text. The '402 patent discloses dimmers and related power control devices (e.g., fan speed control devices) at FIGS. 57-74 and the related text. The '402 patent discloses a combination dimmer and light at FIG. 76 and the associated text. The '402 patent discloses a combination dimmer, rocker switch and light at FIG. 77 and the associated text. The '402 patent discloses a combination dimmer, electrical switch, receptacle outlet and light at FIG. 80 and the associated text. The '402 patent discloses a combination dimmer and receptacle outlet at FIG. 81 and the associated text.

Reference is made to U.S. Pat. No. 5,986,357, which is incorporated herein by reference as though fully set forth in its entirety, for a more detailed explanation of an occupancy sensor.

Reference is made to U.S. Pat. No. 9,091,403, which is incorporated herein by reference as though fully set forth in its entirety, for a more detailed explanation of a night light device. Reference is made to U.S. Pat. No. 7,790,982, which is incorporated herein by reference as though fully set forth in its entirety, for a more detailed explanation of an electrical wiring device (outlet receptacles, GFCI, etc.) in combination with a center night light and sensor.

Reference is made to U.S. Pat. No. 6,433,977, which is incorporated herein by reference as though fully set forth in its entirety, for a more detailed explanation of a combination AFCI/GFCI with a single test button.

Reference is made to U.S. Pat. No. 8,072,779, which is incorporated herein by reference as though fully set forth in its entirety, for a more detailed explanation of low voltage devices such as coaxial sockets, telephone sockets, data sockets, RCA ports, HDMI ports, S-Video ports, low voltage ports, DC voltage ports, etc.

Reference is made to U.S. Pat. No. 8,758,031, which is incorporated herein by reference as though fully set forth in its entirety, for a more detailed explanation of USB receptacles and USB connections.

All of these devices incorporated herein by reference as though fully set forth in its entirety may be employed in the system of the present invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A wall plate article for use with at least one electrical wiring device, the at least one electrical wiring device being configured to be mounted to a device box, the device box being configured to be installed within a structure, the wall plate article having N-gangs for accommodating the at least one electrical wiring device, N being an integer value greater than or equal to one, the article comprising:

a plate portion comprising a finish surface bounded by a perimeter, the finish surface having a latitudinal profile characterized by a latitudinal arc and a longitudinal profile characterized by a longitudinal arc, the latitudinal arc being defined as a section of a first circle having a first radius and a first chord substantially equal to a latitudinal dimension of the plate portion, the first radius being a function of N, the longitudinal arc being defined as a portion of a second circle having a second radius and a second chord substantially equal to a longitudinal dimension of the plate portion; and a wall portion disposed around the perimeter of the plate portion, the wall portion including a first wall portion having a substantially uniform width and a second wall portion, the first wall portion connected to and extending away from the perimeter, the second wall portion being characterized by a reverse draft so that the second wall portion extends at a second oblique angle from the first wall portion in a direction under the first wall portion.

2. The article of claim 1, wherein the plate portion includes at least one opening configured to accommodate at least one user interface of the at least one electrical wiring device.

3. The article of claim 2, wherein the at least one opening is selected from a group of openings configured to accommodate an electrical switch, a toggle switch, a receptacle, a ground fault circuit interrupter (GFCI), an arc fault circuit interrupter (AFCI), a receptacle, or a combination device including one or more of the above devices.

4. The article of claim 2, wherein the at least one opening includes one or more said openings.

5. The article of claim 1, wherein N is within a range of integers from one (1) to six (6).

6. The article of claim 1, wherein the finish surface is selected from a group of finish surfaces including a substantially smooth surface, a continuous surface, a non-segmented surface, a textured surface, a multi-textured surface or a multi-component surface.

7. The article of claim 1, wherein the wall portion and the plate portion form an interior volume space, the interior volume space being configured to accommodate a portion of the at least one electrical wiring device therewithin.

8. The article of claim 1, wherein the second wall portion is configured to abut a surface of the structure when the wall plate article is coupled to the at least one electrical wiring device.

9. The article of claim 1, wherein a plurality of longitudinal cross sections taken at a plurality of positions along a latitudinal axis of the plate portion have a substantially identical longitudinal profile characterized by the longitudinal arc, and wherein a plurality of latitudinal cross sections taken at a plurality of positions along a longitudinal axis of the plate portion have a substantially identical latitudinal profile characterized by the latitudinal arc.

10. The article of claim 1, wherein the wall plate article is coupled to the at least one electrical wiring device or a device box without screws.

11. The article of claim 1, wherein the wall portion includes a screwless fastener arrangement configured to couple the article to the electrical wiring device or a device box.

12. The article of claim 1, wherein the first wall portion extends away from the perimeter at a first oblique angle, the first oblique angle being approximately 2 degrees or less, and wherein the second oblique angle is substantially within a range including 5 degrees and 15 degrees.

13. The article of claim 1, wherein the first wall portion includes an overhang substantially parallel to the finish surface, the second wall portion extending at the second oblique angle from the overhang in a direction under the first wall portion and the finish surface.

14. The article of claim 1, wherein the wall plate article is configured to complete a device box enclosure.

15. An electrical wiring device assembly for use in a device box configured to be installed within a structure, the assembly comprising:
a subplate member configured to be coupled to the device box; and
a wall plate configured to be coupled to the subplate member, the wall plate having N-gangs for accommodating at least one electrical wiring device, N being an integer value greater than of equal to one, the wall plate including a finish surface, the finish surface having a latitudinal profile characterized by a latitudinal arc and a longitudinal profile characterized by a longitudinal arc, the latitudinal arc being defined as a section of a first circle having a first radius and a first chord substantially equal to a latitudinal dimension of the wall plate, the first radius being a function of N, the longitudinal arc being defined as a portion of a second circle having a second radius and a second chord substantially equal to a longitudinal dimension of the wall plate, the wall plate further including a wall portion disposed at a perimeter of the finish surface, the wall portion including a substantially uniform first wall portion extending from the finish surface and a second wall portion extending from the first wall portion, the second wall portion being configured to substantially extend underneath the finish surface.

16. The assembly of claim 15, wherein the at least one electrical wiring device is configured to be installed within the device box.

17. The assembly of claim 16, wherein the subplate member is configured to be connected to the at least one electrical wiring device.

18. The assembly of claim 16, wherein the at least one electrical wiring device is selected from a group of electrical wiring devices including an electrical switch device, a dimmer device, an outlet receptacle device, a timer device, a fan control device, a ground fault circuit interrupter (GFCI), an arc fault circuit interrupter (AFCI), a blank device, a coaxial cable connection device, a phone jack connection device, an RJ45 connection device, an home system control device, a speaker control device, a night light device, an USB receptacle device, an USB connection device, an RCA cable connection device, an occupancy sensor device, a vacancy sensor device, or a combination device including one or more of the above devices.

19. The assembly of claim 18, wherein the subplate member includes at least one subplate opening configured to accommodate the at least one user interface when the subplate member is coupled to the at least one electrical wiring device, and wherein the wall plate includes at least one wall plate opening configured to accommodate at least one user interface.

20. The assembly of claim 15, wherein the subplate member further includes a plurality of first screwless attachment elements and the wall plate has a plurality of second screwless attachment elements configured to mate with the plurality of first screwless attachment elements to couple the wall plate to the subplate.

21. The assembly of claim 15, wherein the subplate member includes at least one subplate opening and the wall plate includes at least one wall plate opening substantially corresponding to the at least one subplate opening, the at least one wall plate opening and the at least one subplate opening being configured to accommodate at least one user interface of at least one electrical wiring device.

22. The assembly of claim 21, wherein the at least one subplate opening or the at least one wall plate opening is selected from a group of openings configured to accommodate an electrical switch, a toggle switch, a receptacle, a ground fault circuit interrupter (GFCI), an arc fault circuit interrupter (AFCI), a receptacle, or a combination device including one or more of the above devices.

23. The assembly of claim 22, wherein the at least one opening includes one or more said openings.

24. The assembly of claim 15, wherein the subplate member includes at least one first alignment element and the wall plate includes at least one second alignment element, the at least one first alignment element and the at least one second alignment element being registered when the wall plate is coupled to the subplate.

25. The assembly of claim 15, wherein N is within a range of integers from one (1) to six (6).

26. The assembly of claim 15, wherein a plurality of longitudinal cross sections taken at a plurality of positions along a latitudinal axis of the wall plate have a substantially identical longitudinal profile characterized by the longitudinal arc, and wherein a plurality of latitudinal cross sections taken at a plurality of positions along a longitudinal axis of the wall plate have a substantially identical latitudinal profile characterized by the latitudinal arc.

27. The assembly of claim 15, wherein the wall plate is coupled to the subplate member without screws, at least one electrical wiring device without screws, or the device box without screws.

28. The assembly of claim 15, wherein the first wall portion extends away from the perimeter at a first oblique angle, and wherein the second wall portion extends from the first wall portion at a second oblique angle.

29. The assembly of claim 15, wherein the first wall portion includes an overhang, the overhang having a ledge substantially parallel to the finish surface, the second wall portion extending from the ledge at the second oblique angle.

30. The assembly of claim 15, wherein the subplate member includes a plate surface having a latitudinal subplate profile characterized by a subplate latitudinal arc and a longitudinal subplate profile characterized by a subplate longitudinal arc so that the subplate member substantially conforms to an interior surface of the wall plate.

31. The assembly of claim 30, wherein a plurality of longitudinal cross sections of the subplate taken at a plurality of positions along a latitudinal axis of the subplate have a substantially identical longitudinal profile characterized by the subplate longitudinal arc, and wherein a plurality of latitudinal cross sections of the subplate taken at a plurality of positions along a longitudinal axis of the subplate have a substantially identical latitudinal profile characterized by the subplate latitudinal arc.

32. The assembly of claim 15, wherein the wall plate is configured to complete a device box enclosure when the wall plate is coupled to the subplate member, the second wall portion being configured to abut a surface of the structure when the wall plate completes the device box enclosure.

33. A wall plate article for use with at least one electrical wiring device, the at least one electrical wiring device being configured to be mounted to a device box, the device box being configured to be installed within a structure, the wall plate article having N-gangs, N being an integer value greater than or equal to two, the article comprising:
   a plate portion comprising a finish surface bounded by a perimeter, the finish surface having a latitudinal profile characterized by a latitudinal arc and a longitudinal profile characterized by a longitudinal arc, the latitudinal arc being defined as a section of a first circle having a first radius and a first chord substantially equal to a latitudinal dimension of the plate portion, the first radius being a function of N, the longitudinal arc being defined as a portion of a second circle having a second radius and a second chord substantially equal to a longitudinal dimension of the plate portion; and
   a wall member disposed around the perimeter to form an interior volume space.

34. The article of claim 33, wherein the wall member includes a first wall portion having a substantially uniform width and a second wall portion, the first wall portion connected to and extending away from the perimeter, the second wall portion being characterized by a reverse draft so that the second wall portion extends at a second oblique angle from the first wall in a direction under the first wall portion.

35. The article of claim 34, wherein the first wall portion extends away from the perimeter at a first oblique angle.

36. The article of claim 35, wherein the first oblique angle is approximately 2 degrees or less, and wherein the second oblique angle is substantially within a range including 5 degrees and 15 degrees.

37. The article of claim 33, wherein the plate portion includes at least one opening configured to accommodate at least one user interface of the at least one electrical wiring device, and wherein the at least one opening is selected from a group of openings configured to accommodate an electrical switch a toggle switch, a receptacle, a ground fault circuit interrupter (GFCI), an arc fault circuit interrupter (AFCI), a receptacle, or a combination device including one or more of the above devices.

38. The article of claim 37, wherein the at least one opening includes one or more said openings.

39. The article of claim 38, wherein N is within a range of integers from two (2) to six (6).

40. The article of claim 33, wherein the finish surface is selected from a group of finish surfaces including a substantially smooth surface, a continuous surface, a non-segmented surface, a textured surface, a multi-textured surface or a multi-component surface.

41. The article of claim 33, wherein a plurality of longitudinal cross sections taken at a plurality of positions along a latitudinal axis of the plate portion have a substantially identical longitudinal profile characterized by the longitudinal arc, and wherein a plurality of latitudinal cross sections taken at a plurality of positions along a longitudinal axis of the plate portion have a substantially identical latitudinal profile characterized by the latitudinal arc.

42. The article of claim 33, wherein the wall plate article is configured to mate with a subplate member to form an electrical assembly, and wherein the subplate is configured to be coupled to at least one electrical wiring device.

43. The assembly of claim 42, wherein the at least one electrical wiring device is selected from a group of electrical wiring devices including an electrical switch device, a dimmer device, an outlet receptacle device, a timer device, a fan control device, a ground fault circuit interrupter (GFCI), an arc fault circuit interrupter (AFCI), a blank device, a coaxial cable connection device, a phone jack connection device, an RJ45 connection device, an home system control device, a speaker control device, a night light device, an USB receptacle device, an USB connection device, an RCA cable connection device, an occupancy sensor device, a vacancy sensor device, or a combination device including one or more of the above listed devices.

44. The assembly of claim 42, wherein the subplate member includes a plate surface having a latitudinal subplate profile characterized by a subplate latitudinal arc and a longitudinal subplate profile characterized by a subplate longitudinal arc so that the subplate member substantially conforms to an interior surface of the wall plate.

45. The assembly of claim 44, wherein a plurality of longitudinal cross sections of the subplate taken at a plurality of positions along a latitudinal axis of the subplate have a substantially identical longitudinal profile characterized by the subplate longitudinal arc, and wherein a plurality of latitudinal cross sections of the subplate taken at a plurality of positions along a longitudinal axis of the subplate have a substantially identical latitudinal profile characterized by the subplate latitudinal arc.

46. The assembly of claim 42, wherein the wall plate is configured to complete a device box enclosure when the wall plate is coupled to the subplate member.

\* \* \* \* \*